US012619521B2

(12) United States Patent (10) Patent No.: US 12,619,521 B2
Shwarzman et al. (45) Date of Patent: May 5, 2026

(54) AUTOMATED TESTING OF WALKTHROUGHS

(71) Applicant: WALKME LTD., Tel Aviv (IL)

(72) Inventors: Stas Shwarzman, Netanya (IL); Yossi Zarfati, Tel Aviv-Jaffa (IL); Shlomi Sasson, Givat Zeev (IL)

(73) Assignee: WALKME LTD., Tel Aviv (IL)

( * ) Notice: Subject to any disclaimer, the term of this patent is extended or adjusted under 35 U.S.C. 154(b) by 11 days.

(21) Appl. No.: 18/263,808

(22) PCT Filed: Jan. 20, 2022

(86) PCT No.: PCT/IL2022/050092
§ 371 (c)(1),
(2) Date: Aug. 1, 2023

(87) PCT Pub. No.: WO2022/168080
PCT Pub. Date: Aug. 11, 2022

(65) Prior Publication Data
US 2024/0118997 A1 Apr. 11, 2024

(51) Int. Cl.
*G06F 11/3668* (2025.01)

(52) U.S. Cl.
CPC ...... *G06F 11/3688* (2013.01); *G06F 11/3684* (2013.01); *G06F 11/3692* (2013.01); *G06F 11/3696* (2013.01)

(58) Field of Classification Search
None
See application file for complete search history.

(56) References Cited

U.S. PATENT DOCUMENTS 9,703,684 B1 * 7/2017 Sanborn de Asis ........................ G06F 11/3688
9,922,008 B2 3/2018 Cohen et al.
(Continued)

FOREIGN PATENT DOCUMENTS

CN 106339319 A 1/2017
WO 2012073197 A1 6/2012
WO 2020222219 A1 11/2020

OTHER PUBLICATIONS

C. Klammer, R. Ramler and H. Stummer, "Harnessing Automated Test Case Generators for GUI Testing in Industry," 2016 42th Euromicro Conference on Software Engineering and Advanced Applications (SEAA), Limassol, Cyprus, 2016, pp. 227-234. (Year: 2016).*
Ritam Jyoti Sarmah et al., "Geno: A Developer Tool for Authoring Multimodal Interaction on Existing Web Applications," Jul. 19, 2020, arXiv:2007.09809v1 [cs.HC] (Year: 2020).*
(Continued)

*Primary Examiner* — Andrew M. Lyons
(74) *Attorney, Agent, or Firm* — Tutunjian & Bitetto, P.C.

(57) ABSTRACT

A product, system and method comprising: obtaining a test of a walkthrough of an application, wherein the application comprises a Graphical User Interface (GUI), wherein the walkthrough is defined by a sequence of steps and associated advancement conditions, wherein the test comprises a sequence of automated user actions to be provided to the GUI that is configured to invoke the sequence of steps of the walkthrough; executing, at least partially, the test on the walkthrough, wherein said executing comprises providing the sequence of automated user actions in a manner that is configured to cause the sequence of steps to be invoked; generating a trace display of the test execution, wherein the trace display comprises a visual display of events including both steps of the walkthrough and automated user actions of the test; and outputting the trace display.

20 Claims, 14 Drawing Sheets

(56) References Cited

U.S. PATENT DOCUMENTS

| | | | | |
|---|---|---|---|---|
| 11,119,906 | B1* | 9/2021 | Edouard | G06Q 20/10 |
| 11,334,471 | B1 | 5/2022 | Stocker | G06F 11/3664 |
| 2008/0141221 | A1* | 6/2008 | Benesovska | G06F 11/3688 |
| | | | | 717/124 |
| 2009/0150872 | A1* | 6/2009 | Russell | G06F 8/656 |
| | | | | 717/140 |
| 2009/0288070 | A1* | 11/2009 | Cohen | G06F 11/366 |
| | | | | 717/125 |
| 2012/0023484 | A1* | 1/2012 | Demant | G06F 8/38 |
| | | | | 717/125 |
| 2014/0325479 | A1* | 10/2014 | Barak | G06F 11/3688 |
| | | | | 717/124 |
| 2016/0147645 | A1 | 5/2016 | Kandpal | |
| 2016/0314066 | A1* | 10/2016 | Mirza | H04L 67/51 |
| 2017/0109263 | A1* | 4/2017 | Anand | G06F 8/00 |
| 2017/0277625 | A1 | 9/2017 | Shtuchkin et al. | |
| 2020/0012587 | A1 | 1/2020 | Girata, Jr. et al. | |

OTHER PUBLICATIONS

Anonymous, Quality Assurance Testing—WalkMe Support, WalkMe [online], 2018 [retrieved Apr. 15, 2020], Retrieved from Internet: <URL: https://web.archive.org/web/20200927033253/https://support.walkme.com/knowledge-base/quality-assurance-testing/>, whole document.

International Search Report from International Application No. PCT/IL2022/050092 dated Apr. 7, 2022, 3 pgs.

Clayton Lewis, et al., Testing a Walkthrough Methodology for Theory-Based Design of WalkUp- and-Use Interfaces, In:CHI 1990 Proceedings, Seattle Washington, Apr. 1-5, 1990, pp. 235-242, ACM, New York.

Xun Yuan, Generating Event Sequence-Based Test Cases Using GUI Runtime State Feedback, IEEE Transactions on Software Engineering, Jan. 2010, pp. 81-95, vol. 36, No. 1.

List of Patents or Patent Applications Treated as Related dated Aug. 1, 2023, 7 pages.

* cited by examiner

Figure 5:
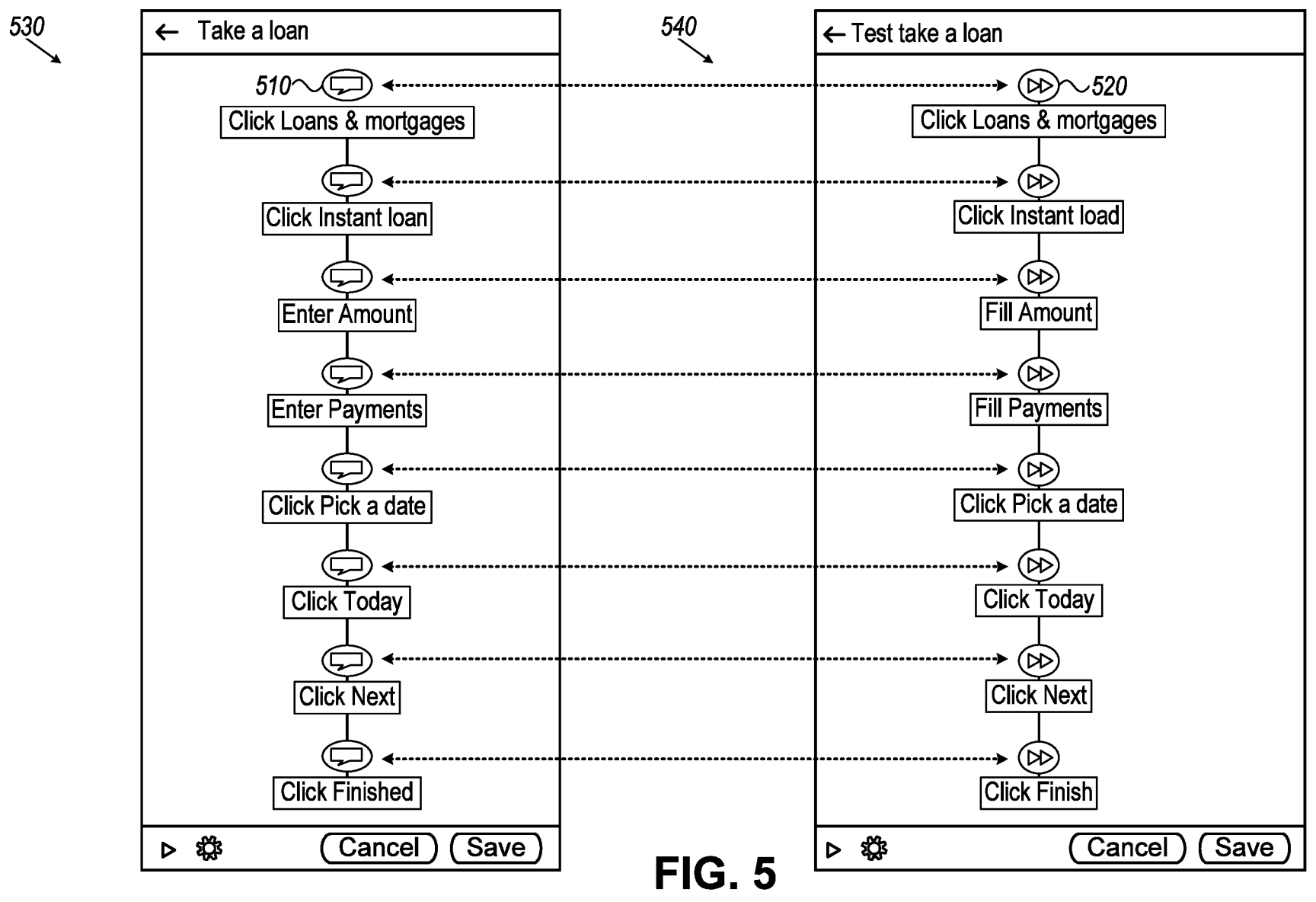

← Test take a loan

520

Click Loans & mortgages

Click Instant load

Fill Amount

Fill Payments

Click Pick a date

Click Today

Click Next

Click Finish

Cancel Save

← Take a loan

510

Click Loans & mortgages

Click Instant loan

Enter Amount

Enter Payments

Click Pick a date

Click Today

Click Next

Click Finished

Cancel Save

| | Test take a loan | PASSED | | |
|---|---|---|---|---|
| | STARTED: | 5 minutes... | RESOLUTION: | 1920x1200 |
| | DURATION: | 00:00:36 | BROWSER: | Chrome |
| | LANGUAGE: | Default | OS: | Windows |

| Name | | Fail reason | Screenshot |
|---|---|---|---|
| | Click Walk me through | | |
| | Test take a loan | | |
| 610 | Click Take a loan | | |
| | Test take a loan | | |
| 620 | Click Loans and mortgages | | |
| | Test take a loan | | |
| 630 | Click Loans and mortgages | | |
| | Test take a loan | | |
| | Click Instant loan | | |
| | Take a loan | | |
| | Click Instant loan | | |
| | Test take a loan | | |
| | Enter amount | | |
| | Take a loan | | |
| | Fill amount | | |
| | Test take a loan | | |
| | Enter payments | | |
| | Take a loan | | |
| | Fill payments | | |
| | Test take a loan | | |
| | Click Pick a date | | |
| | Take a loan | | |

Figure 11A:
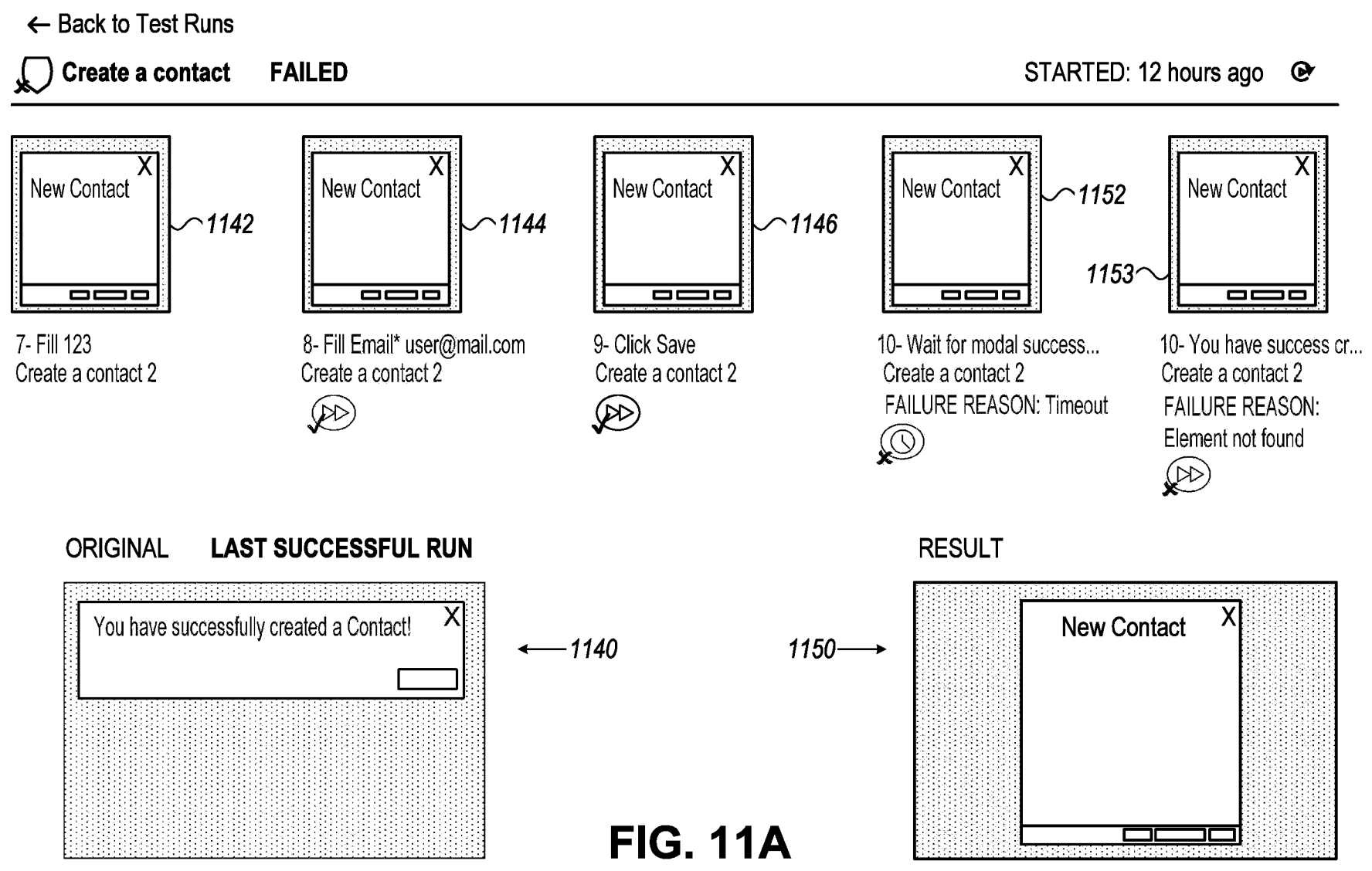

← Back to Test Runs

Create a contact    FAILED

STARTED: 12 hours ago

1142

New Contact    X

7- Fill 123
Create a contact 2

1144

New Contact    X

8- Fill Email* user@mail.com
Create a contact 2

1146

New Contact    X

9- Click Save
Create a contact 2

1152

New Contact    X

10- Wait for modal success...
Create a contact 2
FAILURE REASON: Timeout

1153

New Contact    X

10- You have success cr...
Create a contact 2
FAILURE REASON:
Element not found

ORIGINAL    LAST SUCCESSFUL RUN

You have successfully created a Contact!

1140

RESULT

New Contact    X

AUTOMATED TESTING OF WALKTHROUGHS

CROSS-REFERENCE TO RELATED APPLICATION

This application is a U.S. National Stage of PCT/IL2022/050092 filed on Jan. 20, 2022 which claims the benefit of U.S. patent application Ser. No. 17/170,121, titled "Automated Testing of Walkthroughs" filed Feb. 8, 2021, now, U.S. Pat. No. 11,520,690, which is hereby incorporated by reference in its entirety without giving rise to disavowment.

TECHNICAL FIELD

The present disclosure relates to test automation in general, and to test walkthroughs and augmented functionalities, in particular.

BACKGROUND

Walkthroughs in applications can be a useful tool to improve customer and employee onboarding processes, as well as to improve productivity as a whole, improve customer retention and have other significant advantages.

WALKME® provides a DAP™ system enabling users to enhance existing Graphical User Interfaces (GUIs) of existing applications. Such walkthroughs include in-application (in-app) walkthroughs that are limited to a single application; cross-application walkthroughs that guide the user through the use of several different applications; or the like. Such walkthroughs may be implemented over web-based applications, which can be processed differently depending on the execution environment (e.g., CHROME™, FIREFOX™, or the like). Additionally or alternatively, the walkthroughs may be implemented over desktop applications, running on WINDOWS™ OSX™, or the like. Additionally or alternatively, the walkthroughs may be implemented over native mobile applications, e.g., running on iOS™, ANDROID™, or the like. As another example, the application may have a web mobile version, running on mobile browsers. As yet another example, the application may have been written using a cross platform framework such as XAMARIN™, REACT NATIVE™, or the like.

BRIEF SUMMARY

One exemplary embodiment of the disclosed subject matter is a method comprising: obtaining a test of a walkthrough of an application, wherein the application comprises a Graphical User Interface (GUI), wherein the walkthrough is provided by a provider different than a provider of the application, wherein the walkthrough is defined by a sequence of steps and associated advancement conditions, wherein in response to an advancement condition being met, a next step in the sequence of steps is configured to be invoked, wherein at least one advancement condition of the advancement conditions is configured to be met by actions of a user that is interacting with the GUI, wherein the test comprises a sequence of automated user actions to be provided to the GUI that is configured to invoke the sequence of steps of the walkthrough, wherein the sequence of automated user actions is configured to mimic activity of the user; executing, at least partially, the test on the walkthrough, wherein said executing comprises providing the sequence of automated user actions in a manner that is configured to cause the sequence of steps to be invoked, at least in part, whereby providing a test execution; generating a trace display of the test execution, wherein the trace display comprises a visual display of events, wherein the events comprise both steps of the walkthrough and automated user actions of the test, whereby providing an interleaved display between a visual representation of the walkthrough and a visual representation of the test; and outputting the trace display.

Optionally, the walkthrough comprises a first step and a second step, the second step follows the first step in the sequence, and the first step is associated with a first advancement condition. The test comprises one or more first automated user actions and one or more second automated user actions, wherein the one or more second automated user actions follow the first automated user actions in the sequence, wherein the first automated user actions are configured to cause the first advancement condition of the first step to be met; and wherein said executing comprises: implementing the one or more first automated user actions of the test; monitoring the application to identify that the second step is invoked; and in response to identifying that the second step is invoked, implementing the one or more second automated user actions of the test.

Optionally, the second step is associated with a second advancement condition, the walkthrough comprises a third step, the third step follows the second step in the sequence, wherein said executing comprises: in response to identifying that the third step is not invoked after said implementing the one or more second automated user actions of the test, indicating that the walkthrough failed to properly operate.

Optionally, said executing comprises identifying a failed step of the sequence of steps, wherein the test did not cause a subsequent step of the walkthrough to be invoked, wherein the trace display comprises a visual indication of the failed step.

Optionally, said executing comprises determining a failed sub-sequence of the sequence of steps, wherein the failed sub-sequence comprises a plurality of steps that starting with an initial step that is estimated to have not been properly operated by the test, wherein the failed sub-sequence comprises the initial step and a failed step, wherein the failed sub-sequence ends with the failed step, wherein the trace display comprises a visual indication of the failed sub-sequence.

Optionally, the walkthrough is configured to utilize an acquisition process, wherein the acquisition process is configured to identify an element in the GUI based on parameters associated with the element.

Optionally, the method comprises displaying a walkthrough display, wherein the walkthrough display comprises a visual display of the sequence of steps, wherein the walkthrough display is different from the trace display.

Optionally, the method comprises displaying a test display, wherein the test display comprises a visual display of the sequence of automated user actions, wherein the test display is different from the trace display.

Optionally, the advancement conditions are configured to be met by at least one of: a timeout; a user interaction; an automated user action; and an external event.

Another exemplary embodiment of the disclosed subject matter is a system comprising a processor and coupled memory, the processor being adapted to: obtain a test of a walkthrough of an application, wherein the application comprises a Graphical User Interface (GUI), wherein the walkthrough is provided by a provider different than a provider of the application, wherein the walkthrough is defined by a sequence of steps and associated advancement conditions, wherein in response to an advancement condition being met, a next step in the sequence of steps is configured to be invoked, wherein at least one advancement condition of the advancement conditions is configured to be met by actions of a user that is interacting with the GUI, wherein the test comprises a sequence of automated user actions to be provided to the GUI that is configured to invoke the sequence of steps of the walkthrough, wherein the sequence of automated user actions is configured to mimic activity of the user; execute, at least partially, the test on the walkthrough, wherein said executing comprises providing the sequence of automated user actions in a manner that is configured to cause the sequence of steps to be invoked, at least in part, whereby providing a test execution; generate a trace display of the test execution, wherein the trace display comprises a visual display of events, wherein the events comprise both steps of the walkthrough and automated user actions of the test, whereby providing an interleaved display between a visual representation of the walkthrough and a visual representation of the test; and output the trace display.

Yet another exemplary embodiment of the disclosed subject matter is a non-transitory computer readable medium retaining program instructions, which program instructions when read by a processor, cause the processor to: obtain a test of a walkthrough of an application, wherein the application comprises a Graphical User Interface (GUI), wherein the walkthrough is provided by a provider different than a provider of the application, wherein the walkthrough is defined by a sequence of steps and associated advancement conditions, wherein in response to an advancement condition being met, a next step in the sequence of steps is configured to be invoked, wherein at least one advancement condition of the advancement conditions is configured to be met by actions of a user that is interacting with the GUI, wherein the test comprises a sequence of automated user actions to be provided to the GUI that is configured to invoke the sequence of steps of the walkthrough, wherein the sequence of automated user actions is configured to mimic activity of the user; execute, at least partially, the test on the walkthrough, wherein said executing comprises providing the sequence of automated user actions in a manner that is configured to cause the sequence of steps to be invoked, at least in part, whereby providing a test execution; generate a trace display of the test execution, wherein the trace display comprises a visual display of events, wherein the events comprise both steps of the walkthrough and automated user actions of the test, whereby providing an interleaved display between a visual representation of the walkthrough and a visual representation of the test; and output the trace display.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 5 illustrates an exemplary test sequence and a corresponding walkthrough sequence, in accordance with some exemplary embodiments of the disclosed subject matter;

FIG. 6 illustrates an exemplary trace display, in accordance with some exemplary embodiments of the disclosed subject matter;

FIGS. 11A-11B illustrate screenshots of a GUI, in accordance with some exemplary embodiments of the disclosed subject matter.

DETAILED DESCRIPTION

Figure 1:
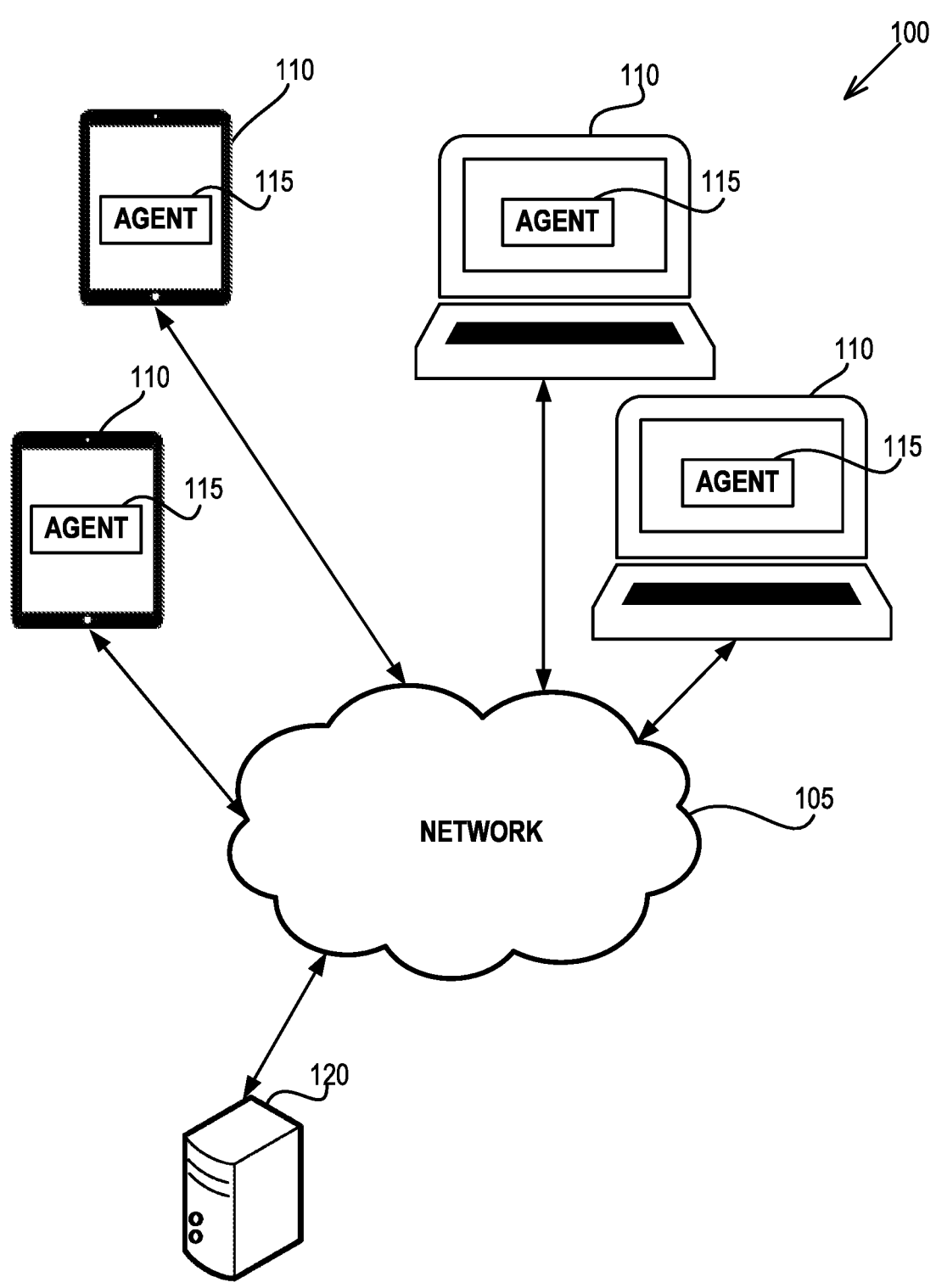
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to test or verify automatically whether a walkthrough of an application matches a specific Graphical User Interface (GUI) display of the application. In some exemplary embodiments, a walkthrough may be a tutorial which, when executed, presents in a sequential manner descriptive elements relating to the GUI, such as disclosed in U.S. Pat. No. 9,922,008, titled "Calling Scripts Based Tutorials", which is hereby incorporated by reference in its entirety for all purposes without giving rise to disavowment. The descriptive elements may include instructions and/or examples of usage, and may be associated with respective GUI elements, such as a specific HTML object within a web document. In some exemplary embodiments, a GUI element in a GUI may be a button, a label, a tooltip, a widget, an input field, a text box, or the like. In some exemplary embodiments, each descriptive element of the walkthrough may be associated with a functionality of one or more GUI elements, e.g., instructing to activate a functionality of the GUI elements, press on a button, provide input to a GUI element, e.g., a text box, or the like.

In order to be able to place the descriptive elements near the respective GUI element, and identify that the respective GUI element is present, there is a need to automatically acquire the GUI element. In some exemplary embodiments, a GUI element may be automatically acquired using an acquisition process if it can be identified within the GUI and referred to by automated means. Once an element is acquired, the GUI may be manipulated to add descriptive element to the acquired elements, modify properties of the acquired elements, display another element in a location adjacent the acquired element, or the like, e.g., as part of the walkthrough or of any other augmented functionality. In some exemplary embodiments, acquiring a GUI element may be challenging, e.g., as there may be different versions of the program, different versions of the GUI, different platforms executing the program and the GUI, or the like, typically requiring manual intervention or assistance. A program may change over time as a result of adding new features, removing features, design changes, bug fixes, or the like. In some exemplary embodiments, during the life cycle of an application, the User eXperience (UX) may change, resulting in a changing GUI over time. In some exemplary embodiments, there may be different versions of a GUI, such as a version of a web page and a version of a desktop application. In some exemplary embodiments, there may be different versions of a GUI in a same platform, e.g., each of which may have different text in a different language. In some exemplary embodiments, users with different roles or permissions may be able to view different versions of a same program page.

In some exemplary embodiments, the acquisition of the GUI element may be based on a representation thereof, a similarity score, or the like. If, however, there is a change in the GUI, the representation may not always be robust, and the acquisition may fail. In some exemplary embodiments, one or more methods of acquisition processes may be used to increase a robustness of an acquisition process of a GUI element, enabling to find the same element over time. In some exemplary embodiments, acquisition of the element may be attempted using one or more methods of acquisition processes, such as using a representation set, as is disclosed in detail in International Patent Application No. PCT/IL2019/050475, titled "GUI Element Acquisition Using A Plurality Of Alternative Representations Of The GUI Element", filed Apr. 30, 2019, which is hereby incorporated in reference in its entirety without giving rise to disavowment. Any other alternative acquisition process or method may be used. In some exemplary embodiments, even in case of increased robustness and efficiency, incorrect acquisitions of GUI elements may still occur, e.g., in a lower frequency and probability. In some exemplary embodiments, acquisitions of GUI elements may fail, such as in case a GUI element that is attempted to be acquired by an acquisition process, is removed from the GUI layout. This may constitute a challenge for walkthrough applications, as they may depend on GUI acquisition for identifying a GUI element of interest.

Another technical problem dealt with by the disclosed subject matter is to test or verify automatically whether an augmented functionality of an application matches a specific GUI layout of the application. In some exemplary embodiments, GUI elements may be acquired and utilized for an augmented functionality such as for augmenting one or more augmented elements to GUI elements of the GUI. In some exemplary embodiments, the augmented elements may provide information regarding the GUI elements, may provide an independent functionality to the GUI that is not associated to the GUI elements, or the like. For example, the augmented elements may be configured to obtain user input from the user, and provide the input to a server, e.g., via a survey element augmented to the GUI. It may be desired to automatically test an accuracy of the augmented functionality, a functionality thereof, or the like.

Yet another technical problem dealt with by the disclosed subject matter is to provide an automated test of a walkthrough or an augmented functionality that is executed on an application of a user device. It may be desired to verify that the walkthrough or the augmented functionality specifically matches the user device or the specific application version of the user device, e.g., prior to executing the walkthrough or the augmented functionality on the user device for being used by the user. In case of a walkthrough, it may be desired to provide an automated test that ensures that instructions of a walkthrough that are associated with a GUI are accurate and match the GUI layout. For example, in case a walkthrough includes a descriptive element that instructs the user to perform a user interaction associated with a GUI element that was removed from the current layout, the instruction cannot be performed by the user as the instruction does not match the layout. It may be desired to ensure, automatically, that a user trying to follow the walkthrough instructions in a given GUI layout, is able to do so. In case of an augmented functionality, it may be desired to provide an automated test that ensures that the augmented functionality is accurate and matches the GUI layout. For example, in case an augmented functionality includes a descriptive element that provides the user with information regarding a GUI element that was removed from the current layout, the information is not accurate as the information does not match the layout. It may be desired to ensure, automatically, that a user trying to utilize the augmented functionality in a given GUI layout, is able to do so.

Yet another technical problem dealt with by the disclosed subject matter is determining a cause of a failed test of a walkthrough, an augmented functionality, or the like.

One technical solution provided by the disclosed subject matter is obtaining a software test layer that is configured to be executed over a software augmentation layer of an application (a walkthrough layer, an augmented functionality layer, or the like), in order to test the augmentation layer as implemented at a user device. In some exemplary embodiments, the augmentation layer may be configured to augment or add a walkthrough or any other functionality over a GUI of an application, a software program, a computer program, or the like, e.g., in order to assist a user of the application with usage of the application, provide additional information to the user, create an additional communication medium between the user and a server, or the like. In some exemplary embodiments, the application may comprise one or more GUIs, each including a screen, a form, a web document, an ANDROID™ layout, an iOS™ playground object, or the like, that may comprise a plurality of GUI elements. In some exemplary embodiments, the augmentation process may be configured to utilize an acquisition process, in order to acquire GUI elements of the walkthrough, the augmented functionality, or the like. In some exemplary embodiments, the acquisition process may be configured to identify an element in the GUI based on parameters associated with the element, similarity scores, or any other acquisition process, e.g., over a plurality of user devices.

In some exemplary embodiments, the augmentation functionality, e.g., the walkthrough, and the test layer may be provided by a same provider that is different from a provider of the application. Accordingly, the augmentation layer and the test layer may not have access to internal data of the application, e.g., source code, timing parameters, captured events, or the like. For example, the application may comprise the WAZE™ navigation mobile program, and a walkthrough that is configured to instruct a user how to use the WAZE™ application for planning a ride may be provided by an entity that is not associated with WAZE™, such as a third party provider that has no access to code or data of WAZE™. In some exemplary embodiments, the third party provider may combine the augmentation layer with a test layer, which may both have access to source code of each other, captured events of each other, acquisition information, timing parameters, or the like. In some exemplary embodiments, the combined layers may create a single software unit or block, including both layers. In some exemplary embodiments, the test layer may utilize the shared data in order to test the walkthrough, the augmented functionality, or the like. In some exemplary embodiments, one or more tests of a walkthrough or any other augmented functionality that is configured to be used for an application, a software program, or the like, may be obtained, e.g., from a server, from an operator recording a test, or the like. In some exemplary embodiments, a user or operator may utilize the test layer in order to record a test of a walkthrough that is running.

In some exemplary embodiments, a walkthrough may be defined by a sequence of steps and associated advancement conditions, which enable the walkthrough flow to advance or continue the sequence flow upon compliance with the conditions. In some exemplary embodiments, the sequence of steps of the walkthrough may be configured to present, in a sequential manner, one or more descriptive elements relating to the GUI. In some exemplary embodiments, each walkthrough step may comprise one or more descriptive elements visually displayed adjacently to respective GUI elements, each descriptive element instructing the user to perform one or more actions associated with GUI elements. In some exemplary embodiments, each step of the walkthrough may enable the next step to be invoked upon compliance with a corresponding advancement condition.

In some cases, the sequence flow of the walkthrough may comprise a flow graph with one or more branches. In some cases, the sequence flow may comprise logical steps such as a conditional branch step that defines more than one possible next flow directions or steps. In some cases, such as in case of a conditional branch step, a conditional branch step may instruct the user to perform a first action in a first case, and to perform a second action in a second case. Thus, two or more descriptive elements may be displayed adjacently to corresponding GUI elements, and only one of them, which is utilized by the user, may consist of a continued part of the walkthrough sequence. For example, the conditional branch step may define that in case a first condition is met, the user should press a first element, and otherwise the user should press on a second element. In some exemplary embodiments, the descriptive elements of the walkthrough may be indicated via an audio medium, a visual medium, or the like. In some cases, a walkthrough step of the walkthrough sequence may comprise augmenting a single descriptive element to a GUI element in the GUI, e.g., instructing the user to perform an action associated to the GUI element, or a plurality of actions that at least one of them is associated to the GUI element.

In some exemplary embodiments, the test layer may be utilized to create a test that enables to test the walkthrough on an end device. In some exemplary embodiments, the test may be created by an operator that records his actions while selecting and launching a walkthrough of the application, and performing the instructed actions. In some exemplary embodiments, upon completing the recording of the test, the test may be re-executed on the same device, or shared to one or more servers or end devices in order to be used by them. In some exemplary embodiments, the created test may comprise a record of automated user actions that are performed in response to associated walkthrough steps. In some exemplary embodiments, in case of a decision branch that branches into two or more decision steps, each including a walkthrough instruction, the test may be configured to perform one or the instructions, e.g., based on the context of the test, based on whether or not a condition is met, or the like. In such a case, a different test may be utilized for each branch. Alternatively, the test may comprise a single test that enables to perform each of the decision branches, e.g., by combining recorded tests of each decision branch.

In some exemplary embodiments, the advancement conditions of the walkthrough steps may define a condition for completing each walkthrough step, thereby enabling a next step of the walkthrough to be invoked, triggered, initiated, performed, or the like. In some exemplary embodiments, the advancement conditions of the walkthrough steps may comprise, for example, conditions that are based on termination or completion of a previous step of the sequence of steps, additional timing conditions associated with the sequence of steps, or the like. In some exemplary embodiments, the advancement conditions may be fulfilled due to a user interaction performing an action that fulfills the condition, or due to any other cause such as a timeout or time limit passing, occurrence of an external event, an automated implementation of the user interaction, a manual user interaction, or the like. In some exemplary embodiments, the advancement conditions may be determined to be fulfilled based on data obtained by the walkthrough layer, e.g., monitored screens of the application that are monitored at the walkthrough layer, input provided to the walkthrough layer, events captured by the walkthrough layer, or the like. For example, an advancement condition may define that a step may be considered to be completed in case the application displays text in a text box of the GUI that was previously empty. As another example, an advancement condition may define that a step may be considered to be completed in case the application displays a pop-up window with certain text therein. As another example, an advancement condition may define that a second step of the walkthrough is to be invoked upon completion of the first step to which an additional interval of five seconds is added.

In some exemplary embodiments, the advancement conditions of the walkthrough may be configured to verify that the previous step of the walkthrough was performed and completed, without requiring a direct data interface with the application, an Application Programming Interface (API) of the application, or the like. For example, the screen of the user device executing the application may be monitored, identifying user interactions with the user interface and responses of the application to the user interactions. In some exemplary embodiments, the monitored data may be analyzed and utilized for identifying compliance with the advancement conditions, instead of directly communicating with the application's backend, its source code, or the like. For example, a walkthrough step may instruct a user to fill out a form and press "enter". This may result with an application window saying, "successfully submitted", which may correspond to an advancement condition of the walkthrough step. The walkthrough layer may monitor the user screen and identify, based on the monitored screen, that the form has been successfully submitted, thus complying with a corresponding advancement condition. Upon identifying compliance with the walkthrough step, the walkthrough layer may invoke a next walkthrough step of the sequence. As another example, pressing a tab may cause the tab content to be presented via the user interface of the application. Monitoring the user's screen may enable the walkthrough layer to identify that the tab has been pressed, by identifying that the screen now displays the tab content, thus invoking the next walkthrough step. In some exemplary embodiments, at least one advancement condition of the advancement conditions may be configured to be met by one or more actions of a user that is interacting with the GUI, e.g., following the instructions of the walkthrough, which may cause a next step of a walkthrough to be invoked. In some exemplary embodiments, at least one advancement condition of the advancement conditions may be configured to be met by a timeout, a user interaction, an automated user action, an external event, or the like. In some exemplary embodiments, in response to an advancement condition being met, a next step in the sequence of steps of the walkthrough may be configured to be invoked. For example, in case the user performs an action that corresponds to a first step of the walkthrough, e.g., fills out a form according to an instruction of the first step of the walkthrough, the advancement condition of the first step may be met upon identifying a popped up window, generated by the application, saying "the form has been submitted".

In some exemplary embodiments, the test layer and the walkthrough layer may comprise a single software unit or block, e.g., a JavaScript™ code or any other type of code, that may be injected to a page of an application. In some exemplary embodiments, the software unit may be injected to the page by a browser extension, may be embedded into the page, or the like. In some exemplary embodiments, upon being injected to the page, the test layer may enable a user to record any desired test of any walkthrough of the application that is available via the walkthrough layer. In some exemplary embodiments, a test may be recorded and executed on the walkthrough, without modifying or recompiling the software unit, e.g., leaving the software unit untouched. In some exemplary embodiments, the software unit may enable a user to record any desired test, by simply performing a desired sequence of user interactions with a GUI executing the walkthrough over the application. In some exemplary embodiments, each test may be specifically tailored for a walkthrough, e.g., performing a functionality that is expected and instructed by the walkthrough. In some exemplary embodiments, the software unit may record the user's performed actions, capture screenshots of the screen, and automate his identified actions, so that they can be automatically repeated thereafter without user input.

In some exemplary embodiments, the recorded automated actions may be edited by the user after the recording session, e.g., configuring the test to provide randomly generated input to a text box, to combine a number of branch decision tests, to define a range of valid inputs, to select a timeout of a walkthrough step that terminates the walkthrough, to edit an environmental condition, to record an additional user action and add it to a target location of the test, to remove an automated user action from the test, or the like. In some exemplary embodiments, the editing may be enabled since the environment of the test may still be executing, running, or the like, enabling further recordation of user actions. As an example, in case an identifier field of a record is required to be unique in a record database, the testing actions may be configured to provide randomly generated input to the identifier field of each record, instead of using the recorded input that the user provided to the field during the test recording.

In some exemplary embodiments, in order to make sure that a user trying to follow the walkthrough instructions is technically enabled to do so, the test of the walkthrough may be executed, at least partially, on the walkthrough. In some exemplary embodiments, the walkthrough may be tested at a client device (also referred to as an end device, a user device, or the like) having access to the application, retaining the application in its memory, or the like. In some exemplary embodiments, a test of a walkthrough may be executed in response to a user instruction, periodically, upon installation of the walkthrough at the user device, or the like. In some exemplary embodiments, prior to execution of the test, the test layer may be configured to execute the application, to execute the walkthrough layer, to identify that the application is running, to identify that the walkthrough is running, or the like. In some exemplary embodiments, the test layer may be configured to determine whether or not the walkthrough instructions and GUI element acquisitions are performed correctly, match the layout displayed at the end device, or the like.

In some exemplary embodiments, the test of the walkthrough may comprise a sequence of recorded automated user actions to be provided to the GUI, that is configured to invoke the sequence of steps of the walkthrough, e.g., instead of the user. In some exemplary embodiments, executing the test on the walkthrough may comprise executing the sequence of automated user actions on the GUI of the user device, in a manner that is configured to cause the sequence of steps of the walkthrough to be invoked, at least in part, whereby providing a test execution. In some exemplary embodiments, the sequence of automated user actions may be configured to mimic the desired activity of the user, e.g., by inserting input or activating a functionality of the GUI according to an expected behavior of a user, thereby complying with the advancement conditions. For example, in case the walkthrough instruction instructs the user to press an "ok" button, a corresponding automated user action may comprise pressing the "ok" button. As another example, in case the walkthrough instruction instructs the user to fill in a form and then press a "submit" button, the corresponding automated user actions may comprise filling in the text boxes of the form and then pressing the "submit" or "save" button, e.g., which may be adjacent to the walkthrough descriptive element.

In some exemplary embodiments, the test steps and the walkthrough steps may be performed in an intertwined manner, one after each other, e.g., similar to the intended use of the walkthrough by a human user. In some exemplary embodiments, an interleaved or intertwined performance may comprise performing a first walkthrough step comprising augmenting one or more descriptive elements, followed by a first test step comprising one or more automated actions, followed by a second walkthrough step, and so on. In some exemplary embodiments, after each walkthrough instruction, the corresponding user actions may be automatically performed by the test as part of the sequence of automated user actions. In some exemplary embodiments, each walkthrough step may be followed by performance of the corresponding action from the sequence of automated user actions. In some exemplary embodiments, the interleaving of the test steps and the walkthrough steps may not necessarily comprise one action for each step. For example, a first test step may comprise two automated user actions, a next walkthrough step may comprise augmenting to the GUI three descriptive elements, a next test step may comprise a single automated user action, and so on. In some cases, a plurality of descriptive elements may be augmented to a same GUI element during a walkthrough step, e.g., instructing the user to perform an associated action. In some cases, a plurality of descriptive elements may be augmented to two or more GUI elements during a walkthrough step, e.g., instructing the user to perform actions associated with the two or more GUI elements in order to complete the step.

In some exemplary embodiments, the walkthrough steps may comprise, in addition to adding descriptive elements to GUI elements, one or more additional actions such as monitoring steps configured to monitor the application's GUI or screen, sub-action steps configured to perform one or more sub-actions in order to complete a walkthrough step, timeout steps monitoring whether a timeout has been completed, a goal step configured to identify a reached goal of the walkthrough, a flag step configured to identify a reached state, or the like. In some exemplary embodiments, the test steps may comprise, in addition to executing automated recorded actions, one or more additional actions such as monitoring steps configured to monitor the application's screen, e.g., to identify whether a next walkthrough step is invoked, sub-action steps configured to perform one or more sub-actions in order to complete a test step, timeout steps identifying whether a timeout has been completed, e.g., a timeout for a next walkthrough step to be invoked, or the like.

In some exemplary embodiments, an interleaved trace display of the test execution may be generated, e.g., upon completion of the test, upon termination of the test, upon identifying an error, during execution of the test, or the like. In some exemplary embodiments, the trace display may comprise a visual display including a log of events, combining a walkthrough event log and a test event log in a chronological manner. In some exemplary embodiments, the events may comprise both the actions performed by the walkthrough and the automated user actions of the test, which mimic the desired user action. In some exemplary embodiments, by combining both the walkthrough actions and the test automated actions in the trace display, the disclosed subject matter provides an interleaved display of events, combining a visual representation of the walkthrough events with a visual representation of the test events, e.g., in a chronological order of execution. In some exemplary embodiments, the interleaved display may comprise at least two automated test events, each separated by two walkthrough events. In some exemplary embodiments, the trace display may be outputted, provided, generated, or the like, e.g., to a screen, a server, an operator's device, or the like.

In some exemplary embodiments, a walkthrough display, e.g., including a sequence of walkthrough events, may be displayed, in addition to or instead of the trace display. In some exemplary embodiments, the walkthrough display may comprise a visual or audio display or indication of the sequence of events of the walkthrough that were performed or attempted to be performed, e.g., including acquiring GUI elements and adding descriptive elements adjacently thereto, monitoring the screen, identifying timeouts, identifying goal states, or the like. In some exemplary embodiments, the walkthrough display may comprise visual cues indicating that an event has been completed successfully, has failed to be performed, is part of a failed sequence that did not function properly, or the like. In some exemplary embodiments, the walkthrough display may be different from the trace display, e.g., as it may not be interleaved with a test display.

In some exemplary embodiments, a test display, e.g., including a sequence of automated user actions, may be displayed in addition to or instead of the trace display, the walkthrough display, or the like. In some exemplary embodiments, the test display may comprise a visual display of the sequence of events performed by the test, attempted to be performed by the test, or the like. In some exemplary embodiments, the test display may comprise visual cues indicating that an event of the test has been executed successfully, has failed to execute, is part of a failed sequence that did not function properly, or the like. In some exemplary embodiments, the test display may be different than the trace display, e.g., as it may not be interleaved with the walkthrough display.

In some exemplary embodiments, the sequence of steps of the walkthrough may comprise a sequence of instructions to perform a corresponding sequence of user actions. In some exemplary embodiments, the sequence of steps of the walkthrough may comprise at least first and second steps, the second step following the first step in the sequence. In some exemplary embodiments, the first step may comprise one or more instructions instructing a user to perform one or more first actions, and the second step may comprise one or more instructions instructing the user to perform one or more second actions. In some exemplary embodiments, the first step may be associated with a first advancement condition, and the second step may be associated with a second advancement condition. In some exemplary embodiments, the advancement conditions may define in what case the next step of the walkthrough is allowed to be performed, is to be invoked, is to be initiated, is to be triggered, or the like. For example, the first and second advancement conditions may define that upon completion of the first and second actions, respectively, the next step in the flow of walkthrough steps may be performed.

In some exemplary embodiments, the test may comprise one or more first automated user actions, e.g., corresponding to the one or more first instructed actions, and one or more second automated user actions, e.g., corresponding to the one or more second instructed actions, the second automated user actions following the first automated user actions in the sequence of test actions. In some exemplary embodiments, in the perspective of the application, the first and second automated user actions may be identical to the first and second actions when performed by a user. However, they may be performed in an automated manner rather than by a human user, which may be unnoticed by the application. In some exemplary embodiments, performing the first automated user actions may be configured to enable the first advancement condition of the first walkthrough step to be met, complied with, or the like, while performing the second automated user actions may be configured to enable the second advancement condition of the second walkthrough step to be met, complied with, or the like.

In some exemplary embodiments, executing the test on the walkthrough may comprise implementing the first automated user actions of the test, monitoring the application display or screen to identify that the next walkthrough step is invoked, and, in response to identifying that the next walkthrough step is invoked, implementing the second automated user action of the test on the application, and so on, e.g., iteratively, until the process is completed, the test is prematurely terminated such as in case of a timeout, or the like. In some exemplary embodiments, executing the test on the walkthrough may enable to identify a failed step of the sequence of steps of the walkthrough. In some exemplary embodiments, the failed step may be identified to include a walkthrough step that, upon executing the test on the walkthrough, did not cause a corresponding walkthrough step to be invoked. In some exemplary embodiments, in response to identifying that a next walkthrough step is not invoked after implementing the second automated user actions of the test, e.g., based on the monitored screen of the user device, the test layer may indicate that the walkthrough failed to properly operate in the user device. In some exemplary embodiments, the failed step may include a walkthrough step and a testing step that was not completed, e.g., due to an incorrect acquisition, a change of the layout, an incorrect test input, or the like. In some exemplary embodiments, the generated trace display may comprise a visual indication of the failed step, e.g., indicating failure using patterns, color, text, or any other visual or audio indication.

In some exemplary embodiments, executing the test on the walkthrough may comprise determining a failed sub-sequence of the sequence of steps of the walkthrough and corresponding automated user actions. In some exemplary embodiments, the failed sub-sequence may comprise a plurality of walkthrough steps starting with an initial step that is estimated to have not been properly operated by the test. In some exemplary embodiments, the failed sub-sequence may end with a failed step. In some exemplary embodiments, a failed sub-sequence including two or more walkthrough steps that may occur, for example, in case automated user actions were able to be executed, but were not executed on the correct GUI elements, did not match the walkthrough instructions, provided a wrong input, were executed on a wrong GUI element that has a similar input or functionality as the original GUI element, or the like. For example, a failure may be a result of a wrong automated user action performed during three consecutive walkthrough steps, or any other number of steps, prior to the failed step that was not able to be completed. In some exemplary embodiments, the failed sub-sequence may be identified based on a comparison of screenshots of the test record and the test execution, information from the walkthrough layer, information from the test layer, monitored data of the application, or the like. In some exemplary embodiments, the trace display may comprise a visual indication of the failed sub-sequence, e.g., indicating failure using patterns, color, text, or any other visual or audio indication, in a manner that may or may not be identical to the indication of the failed step. In some exemplary embodiments, test results, e.g., including recorded tests, displays, screenshots, or the like, may be reported to a server. In some exemplary embodiments, the server may analyze the reports, enable to modify the walkthrough in case a modification is needed, provide the user device with an amended version of the walkthrough, or the like.

Figure 10:
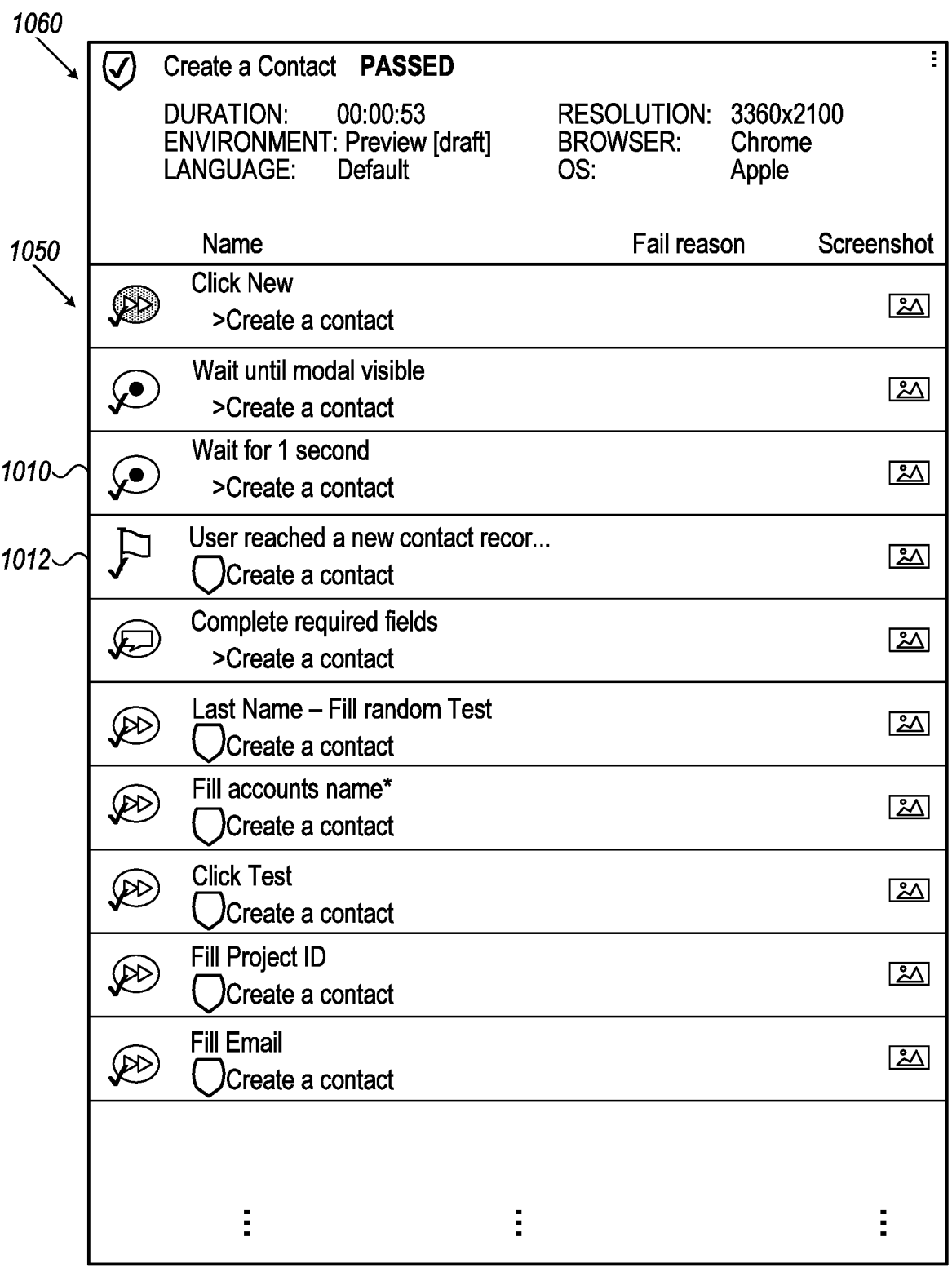
FIG. 10 illustrates an exemplary trace display, in accordance with some exemplary embodiments of the disclosed subject matter.

For example, the test layer may record a test of a walkthrough that instructs a user how to add a new contact to a contact database of an application, e.g., as described in more detail with respect to FIGS. 10 and 11. The test record may record actions of a user that follows the steps of a walkthrough successfully, and thereby adds a new contact to the database. In some exemplary embodiments, during the test recording, the user may input a contact identifier to a corresponding field of a form, e.g., an identifier of "123". Upon re-executing the recorded test, a new contact may be added by automatically inserting the same input that was inserted by the user during the recorded test, e.g., including the input of "123", to the contact identifier field. In some exemplary embodiments, this may cause a failed sub-sequence of the walkthrough, as the contact has an identical identifier as the previously created contact. For example, although the test may be enabled to automatically insert that text "123" to the contact identifier field, and fill in the remaining fields, one or more next walkthrough steps may not be invoked since the application may generate an error of duplicated identifiers, without complying with the advancement condition. Accordingly, the test layer may identify a failed sub-sequence that starts with inserting the text "123" to the contact identifier field, and ends at a failed step, e.g., a next walkthrough step that is not invoked.

In some exemplary embodiments, similarly to the walkthrough layer, an alternative augmentation layer that is configured to add one or more augmented elements to the application's GUI may be tested. In some exemplary embodiments, the augmentation layer may comprise augmenting to the GUI augmented elements such as descriptive elements that provide non-instructive information regarding the GUI elements in the GUI, independent interactive elements that are not associated to the GUI elements, or the like. For example, the augmented elements may comprise icons such as tips that may be presented adjacently to GUI elements and provide corresponding tips to the user, GUI popups such as surveys asking the user for feedback and sending the feedback to a server, or the like. In some exemplary embodiments, the augmented elements may be tested at a client device, by the software unit comprising both the augmentation layer generating the augmented elements and the test layer. In some exemplary embodiments, the test layer may be configured to interact with the augmented elements, e.g., by validating that they exist, interacting with them, and determining whether the interaction resulted with the expected outcome. For example, the interactions may comprise clicking on the augmented elements, entering text to the augmented elements, or the like, which may be performed by a testing user during a recording session. In some exemplary embodiments, the test layer may ensure that the expected results from interacting with the augmented elements, occurs, e.g., by comparing the current result to the recorded result that was displayed during the recorded test. In some exemplary embodiments, in case that the augmentation layer is tested, an interleaved trace display may not be generated, as there may be no sequence of steps corresponding to the automated interactions with the augmented elements. In some exemplary embodiments, testing the augmentation layer may be less sophisticated than testing a walkthrough layer, e.g., since the augmented elements are validated by executing a single automated action of a test and not on a sequence of automated actions with corresponding advancement conditions of the walkthrough.

In some exemplary embodiments, a single test execution may execute multiple tests of walkthroughs and/or augmented elements during one execution, e.g., by performing batch testing. In some exemplary embodiments, a testing operator may select to perform testing in batches, by selecting a plurality of tests that are to be executed together. In some exemplary embodiments, the test layer may be configured to sequentially execute each test of the batch one after the other, e.g., according to the order of selecting the tests, or according to any other order.

One technical effect of utilizing the disclosed subject matter is identifying whether or not a walkthrough of an application at a client device is accurate, can be used by the user, or the like. In some exemplary embodiments, the walkthrough is tested and verified, prior to being used for displaying and executing a walkthrough to the walkthrough users, periodically, or the like, thereby enhancing a user experience and preventing failures of the walkthrough during runtime. The testing may be implemented locally for different versions of the program, different versions of the GUI, different types of user devices, different operating systems, or the like, without requiring manual intervention or assistance. The test may be recorded at each end device or may be obtained from a user that has recorded the test. The disclosed subject matter may provide a reliable walkthrough that is tested for the specific client device on which it is running, thereby enabling the walkthrough to function properly over time in spite of changes to the GUI.

Another technical effect of utilizing the disclosed subject matter is providing and testing a walkthrough for a third party application, without the application necessarily having an accessible dedicated API, without having access to the application's source code, or the like. In contrary to walk-throughs that are native to the application, in which tests of the walkthrough can be executed internally using a backend of the application, implementing the currently disclosed subject matter does not require access to the application's backend. The testing proposed by the currently disclosed subject matter verifies whether advancement conditions of the walkthrough have been fulfilled, whether the desired functionality can be executed, or the like, without requiring access to source code or to any other internal data of the application.

The disclosed subject matter may provide for one or more technical improvements over any pre-existing technique and any technique that has previously become routine or con-ventional in the art. Additional technical problem, solution and effects may be apparent to a person of ordinary skill in the art in view of the present disclosure.

Referring now to FIG. 1 showing an environment, in accordance with some exemplary embodiments of the dis-closed subject matter.

Environment 100 may comprise a plurality of Client Devices 110. Client Devices 110 may be Personal Comput-ers (PCs), tablets, smartphones, or the like. Client Devices 110 may be connected to a Computerized Network 105, such as a Wide Area Network (WAN), a Local Area Network (LAN), a wireless network, the Internet, an intranet, or the like.

In some exemplary embodiments, an Agent 115 may be running on a Client Device 110. In some exemplary embodi-ments, each Client Device 110 may execute a corresponding Agent 115. Additionally or alternatively, only a portion of Client Devices 110 may execute an Agent 115. Agent 115 may be a program product executable by a computer, such as, without limitations, a script, a software, a browser extension, a mobile application, a web application, a Soft-ware Development Kit (SDK), a Standard Widget Toolkit (SWT), a shared library, a Dynamic Link Library (DLL), a combination thereof, or the like. In some exemplary embodi-ments, the Agent 115 may comprise a testing layer and an augmentation layer, e.g., a walkthrough layer, enabling Agent 115 to implement the walkthrough and the testing thereof.

Client Device 110 may be configured to execute an application or program having a GUI. The application may consist of a web page, a web application, a mobile applica-tion, a desktop application, or the like. The application may display to an end-user one or more screens, constituting the GUI, which comprise GUI elements.

In some exemplary embodiments, Agent 115 may be configured to implement a walkthrough, in which descrip-tive elements of the walkthrough may be displayed in a location adjacent to target GUI elements of the application. In order to match the walkthrough to the specific layout of the application's GUI, Agent 115 may perform an acquisi-tion process to identify at least one GUI element appearing in the GUI of the application. For example, Agent 115 may acquire a specific interactive button, a text element, a tool tip, or the like. In some exemplary embodiments, in addition to the walkthrough, Agent 115 may acquire a GUI element in order to track user activity with respect to the application, monitor usage statistics relating to GUI element, implement GUI-based automation, automatically interact with the GUI on behalf of the end-user, mimic user-input, implement GUI manipulations, such as modifying the GUI, remove existing GUI elements, add new GUI elements, or the like. In some exemplary embodiments, upon acquiring a desired element that is referred to by the walkthrough, Agent 115 may present the corresponding descriptive element of the walk-through near the identified GUI element, and monitor the screen to identify whether or not a corresponding advance-ment condition is fulfilled prior to invoking the next walk-through step.

In some exemplary embodiments, Agent 115 may be configured to implement a test of the walkthrough. In some exemplary embodiments, after each walkthrough step, Agent 115 may perform one or more corresponding auto-mated actions, that are configured to invoke the next walk-through step iteratively and comply with its advancement condition. In some exemplary embodiments, in every itera-tion, the Agent 115 may search for the desired GUI element, in case it is found, the Agent 115 may add one or more descriptive elements thereto, and then, using the test layer, perform the recorded user actions that attempts to perform the functionality instructed by the descriptive element.

In some exemplary embodiments, in case the desired GUI element is not found, acquired, identified, or the like, the advancement condition of the walkthrough may not be complied with and the walkthrough may be terminated, e.g., after a timeout, thereby automatically terminating the testing as well. In some exemplary embodiments, in some cases, a GUI element may be identified upon applying an acquisition process on the application's GUI, but the identified GUI element may not be correctly identified. In such a case, the functionality of the GUI element may not be enabled to be executed on the incorrect GUI element, as it may have a different functionality than the original GUI element, thereby terminating the test. Alternatively, in case the incor-rect GUI element obtains a similar input or provides a similar functionality as the original GUI element, the mis-take may be identified in one or more following walkthrough or test steps, by failing to acquire a future GUI element or failing to perform a functionality of a future GUI element.

In some exemplary embodiments, Agent 115 may be configured to generate a trace display comprising all the performed events by both the walkthrough layer and the test layer, e.g., according to their order of execution. In some exemplary embodiments, in case of a failed event or a failed sub-sequence of events, Agent 115 may be configured to indicate the failure via the trace display.

In some exemplary embodiments, in some cases, Agent 115 may be configured to implement an alternative aug-mented functionality, in which augmented elements of GUI elements explaining the elements are added, interactive augmented elements are added regardless of GUI elements, or the like. In order to verify that the augmented elements were successfully added, Agent 115 may test the augmented elements by attempting to identify them, attempting to interact with the augmented elements according to the target functionality. For example, in case an augmented element is a survey configured to obtain user input and report it, Agent 115 may be configured to acquire or identify the survey element, and interact with the element by providing valid input thereto.

Environment 100 may comprise a Server 120, which may be connected to Computerized Network 105. In some exem-plary embodiments, Agent 115 may communicate informa-tion regarding test results to Server 120. In some exemplary embodiments, Agent 115 may report any test failure, the failing step, a sub-sequence failure, or the like. In some exemplary embodiments, Agent 115 may report successful testing execution of a walkthrough or an augmented element to Server 120.

In some exemplary embodiments, Server 120 may analyze testing reports, and determine one or more root causes of a failure, e.g., by comparing screenshots of test executions, the test record, or the like. In some exemplary embodiments, upon obtaining a failure report from an Agent 115 of a Client Device 110, Server 120 may identify one or more fixes for the walkthrough or augmented functionality that can match the layout or other attributes of the Client Device 110, and provide the Client Device 110 with an amended new version of the walkthrough or augmented functionality. In some exemplary embodiments, upon obtaining a failure report from an Agent 115 of a Client Device 110, Server 120 may identify one or more fixes for the test of the walkthrough, and provide the Client Device 110 with an amended new version of the test. In some exemplary embodiments, Agent 115 may obtain the new version of the walkthrough layer or augmentation layer from Server 120 and perform a test of the new version. Alternatively, Agent 115 may perform the functionality of Server 120 and thereby replace Server 120.

Figure 2:
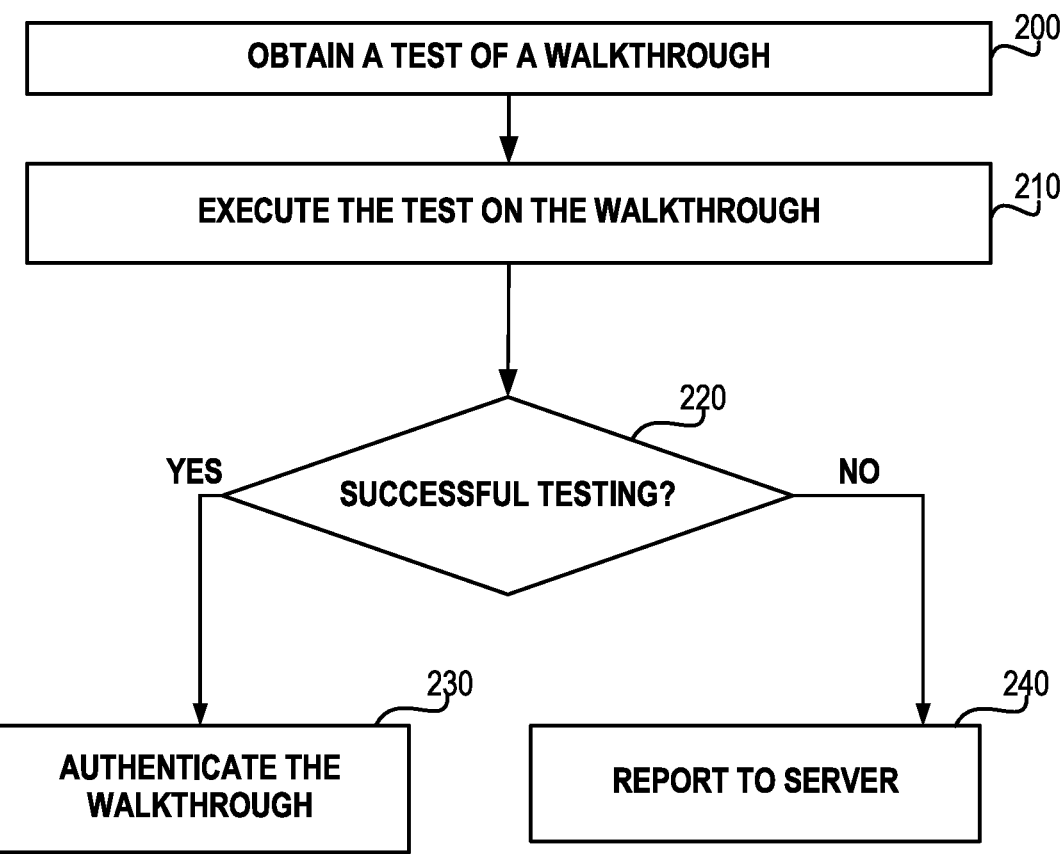
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In some exemplary embodiments, for simplicity of explanation, the currently disclosed subject matter may be exemplified with respect to a walkthrough for an application of a provider, e.g., named "Empire Bank", which is configured to enable a user to perform one or more processes, e.g., to take a loan from the Empire Bank. However, any other process of any type of application from any other provider may be utilized for implementing the currently disclosed subject matter thereover. In some exemplary embodiments, the Empire Bank application may comprise a native mobile application, a website, a dedicated web application, a hybrid application, a generic mobile application, or the like. In some exemplary embodiments, the walkthrough may be implemented with a Standard Widget Toolkit (SWT), or in any other manner.

In some exemplary embodiments, in order to assist a user with taking a loan via the Empire Bank application, a designated walkthrough of the application may be obtained, e.g., from a server, from a walkthrough provider, or the like. In some exemplary embodiments, the walkthrough may be generated, created, or the like, automatically or manually, by a provider different from a provider of the Empire Bank, that is not associated to the Empire Bank and has no access to the Empire Bank's backend, datasets, source code, internal events captured by the application's backend, API, timing parameters, or the like. In some exemplary embodiments, the walkthrough provider may provide a software unit comprising one or more walkthroughs and a test layer enabling to test the one or more walkthroughs. In some exemplary embodiments, from the perspective of the software unit, the Empire Bank application may consist of a third party application that does not provide access to its internal data.

In some exemplary embodiments, the exemplified process of taking a loan via the Empire Bank application may consist of an ordered flow of steps such as Steps 1-8, e.g., as follows:

1. Click Loans and Mortgages item from the top menu of the Empire Bank application.
2. Click Instant Loan item from the top sub-menu.

3. In the form that just opened, enter the load amount.
4. Enter the amount of the desired payments.
5. Click the calendar icon.
6. In the calendar that opened, click Today.
7. Click Next button.
8. On the final screen, click Finish button.

In some exemplary embodiments, upon launching the designated walkthrough, the designated walkthrough may assist the user to accomplish the process by iteratively identifying, in the GUI of the user device, one or more GUI elements (each of which may be represented digitally as a Document Object Model (DOM) element) that are to be used, such as by using an acquisition process. After identifying the GUI elements of the current walkthrough step, the designated walkthrough adds one or more corresponding descriptive elements (e.g., a content balloon) to the identified GUI elements, instructing the user how to use the GUI elements in order to complete the process. In some exemplary embodiments, each step of the process may be associated with at least one GUI element, to which one or more descriptive elements are added instructing the user to activate the GUI element, select it, use it, press it, fill it in, or the like. In some exemplary embodiments, the next steps of the walkthrough may be triggered upon compliance with advancement conditions, e.g., completing the instruction, completing a timeout, or the like.

On Step 200, one or more designated tests of the walkthrough for the Empire Bank application may be obtained, e.g., at a user device. In some exemplary embodiments, the tests may be recorded or defined at the user device, e.g., by an operator or user of the user device. In some exemplary embodiments, the tests may be recorded elsewhere and obtained from a server, a user device, a computing cloud, or the like. In some exemplary embodiments, the test may be recorded by a user manually completing the process of taking a loan according to the walkthrough and recording his actions, and possibly editing the test actions subsequently thereto, e.g., by adding a new recorded action, removing a recorded action, editing an existing action, editing parameters of an existing action, or the like. In some exemplary embodiments, a test may comprise a sequence of automated user actions that are configured to complete the same process as the walkthrough, e.g., the process of taking a loan. In some exemplary embodiments, the sequence of automated user actions may be configured to complete the process in the same manner than the user, e.g., by automatically repeating the recorded actions instructed by the walkthrough and thereby attempting to perform Steps 1-8 as described above. In some exemplary embodiments, in case the test is successful, this may indicate that the layout of the Empire Bank application at the user device matches the walkthrough.

In some exemplary embodiments, each test step of one or more automated user actions may correspond to one or more instructions provided by a corresponding walkthrough step. In some exemplary embodiments, an instruction of the walkthrough step may relate an action that is to be performed to a GUI element, and may be signaled to the user via a descriptive element such as a balloon placed adjacently to the target GUI element. In some exemplary embodiments, the corresponding automated user action of the test may comprise performing the desired action on the GUI element. For example, with respect to Steps 1-8 described above, the test may be recorded by a user performing Steps 1-8 according to the walkthrough instructions. The user's steps may be recorded and automatically repeated for testing in a different time, device, application version, or the like. The first walkthrough step may signal to the user that he should press the "Loans and Mortgages" item from the top menu of the Empire Bank application, e.g., by placing a corresponding descriptive element adjacently to the "Loans and Mortgages" item from the top menu of the Empire Bank application. According to this example, the corresponding automated user action of the test, performed subsequently to the walkthrough step, may comprise selecting the "Loans and Mortgages" item from the top menu of the Empire Bank application, e.g., automatically, as performed by the recorded actions of the user that generated the test, thereby imitating or mimicking the desired user interaction of the walkthrough with the displayed GUI.

On Step 210, the test may be executed, at least partially, on the walkthrough. In some exemplary embodiments, in case a batch of more than one test of the walkthrough is selected to be executed, the batch of tests may be executed according to their order, e.g., sequentially. In some exemplary embodiments, in order to perform the test, the designated application, e.g., the Empire Bank application, may be required to be running, executing, or the like, on the user device, or may be launched by the test layer. In some exemplary embodiments, the test may launch the walkthrough over the application, e.g., by opening a walkthrough menu of a walkthrough provider and selecting a designated walkthrough for a target functionality associated to the Empire Bank application. In some exemplary embodiments, upon launching the desired walkthrough over the Empire Bank application, the test layer may simulate an end user that performs the walkthrough step, e.g., Steps 1-8, by performing the recorded automated user actions. In some exemplary embodiments, in case of batch testing, e.g., multiple testing of different walkthroughs of the same application, each test may launch the corresponding walkthrough, perform the test actions, and upon termination of the walkthrough, launch a next walkthrough of the batch, and so on.

In some exemplary embodiments, the automated user actions may be executed, or attempted to be executed, on the walkthrough that is executed on the Empire Bank application. In some exemplary embodiments, the execution of the automated user actions may be interleaved with the execution of the walkthrough, e.g., after each walkthrough step comprising a set of one or more walkthrough actions, a corresponding test step comprising one or more automated user actions may be attempted to be performed. In some exemplary embodiments, in case performing the test step complies with the advancement condition of the previous walkthrough step, the next walkthrough step may be triggered. In some exemplary embodiments, each walkthrough step may be performed in correlation with a previous test step, such as subsequently thereto.

In some exemplary embodiments, a failure of the test may occur upon failing to perform a walkthrough step, failing to perform an automated user action, a timeout being counted, a combination thereof, or the like. In some exemplary embodiments, failures may occur due to incorrect GUI element acquisition in a current step or in one or more previous steps, wrong test input to the GUI, differences in the GUI layout compared to the original GUI that was used for recording the test, or the like. In some exemplary embodiments, in case a current GUI element is removed from the GUI, not acquired correctly, or the like, the corresponding automated user action of the GUI element or walkthrough step may not be able to execute, the corresponding walkthrough step may not be able to execute, or the like. This may prevent from the advancement condition of the walkthrough to be met, e.g., complying with a time threshold of the condition, thereby preventing the walkthrough and the test to advance, continue execution, or the like.

In some exemplary embodiments, the same acquisition process may be used for the walkthrough layer and for the test layer, e.g., as they may be located in a single software block or unit. In some exemplary embodiments, the test layer may have access to internal data of the walkthrough layer, e.g., acquisition data from the walkthrough layer, events of the walkthrough layer, timing parameters thereof, or the like. In some exemplary embodiments, the test layer may utilize the data from the walkthrough layer for the testing process. For example, compliance with the advancement conditions may be determined using data from the walkthrough layer.

On Step 220, the testing may be determined to be successful or unsuccessful. In some exemplary embodiments, completing execution of the test may indicate that the test is successful, while failing to complete execution may indicate that the test has failed. In some exemplary embodiments, completing execution of a "goal" step of the walkthrough indicating a goal state of the walkthrough may indicate that the test is successful, while failing to complete execution of the "goal" step may indicate that the test has failed. In some exemplary embodiments, the results of the test execution may be analyzed, e.g., locally at the end device or remotely at a server, in order to identify whether or not the test execution was successful, whether the walkthrough execution was successful, to identify execution portions of the test were not completed, a sub-sequence that has failed to complete execution, causes of the failure, possible fixes, or the like. In some exemplary embodiments, the test results may be analyzed automatically, manually, or the like, e.g., based on a comparison between screenshots of the test execution to previous test executions, to the original test record, or the like.

In some exemplary embodiments, a trace display of the test execution may be generated. In some exemplary embodiments, the trace display may comprise an interleaved display of each walkthrough event followed by the corresponding automated user actions of the test. For example, for Steps 1-8, the trace display may display Step 1 of the walkthrough followed by the automated user action of Step 1, and so on. In other cases, a walkthrough step may comprise multiple events such as multiple descriptive elements that are added, monitoring steps, timeout steps, or the like. For example, a walkthrough event may comprise decision steps that provides two descriptive elements to two GUI elements, and instructs the user to perform a functionality of one of the elements based on a condition, a decision, a context, a user preference, or the like. In other cases, a test event may comprise multiple automated actions such as a sequence of automated actions corresponding to a single walkthrough instruction. In some exemplary embodiments, the trace display may be generated to indicate success, failure, or the like, e.g., visually. In some exemplary embodiments, failed events may be indicated differently or similarly from failed sub-sequences.

In some exemplary embodiments, the trace display may be outputted. In some exemplary embodiments, the trace display may be provided to a screen, a display device, a server, or the like. In some exemplary embodiments, a user may be enabled to view the trace display, e.g., via a screen of the user device on which the test was executed. In some exemplary embodiments, an administrative user may be enabled to view the trace display, e.g., via a screen of the administrative user to which the trace display may be provided, via a screen of a server, or the like.

On Step 230, in case the testing was successful, the walkthrough may be authenticated for the user device. In some exemplary embodiments, a user of the user device may be notified that the walkthrough has been tested and been authenticated for his device. In some exemplary embodiments, the testing results, as well as the trace display, may or may not be provided to a server for further analysis.

On Step 240, in case the testing was unsuccessful, the testing results, as well as the trace display, attributes of the user device, or the like, may be reported to a server for further analysis. In some exemplary embodiments, a user of the user device may be notified that the walkthrough has failed its test.

In some exemplary embodiments, FIGS. 3-9 may illustrate the exemplary scenarios of FIG. 2 in more detail.

Figure 3:
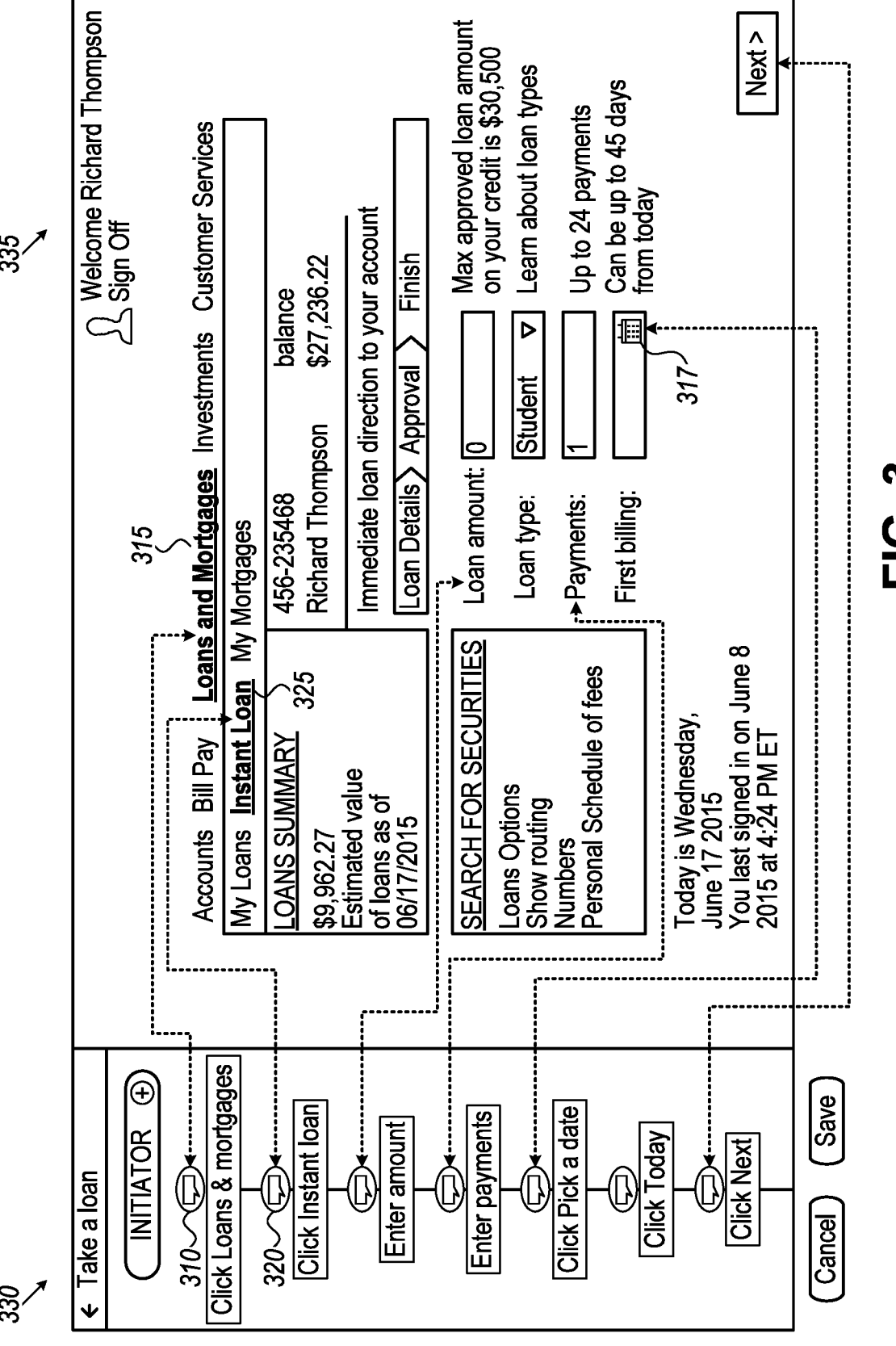
FIG. 3 illustrates an exemplary Graphical User Interface (GUI) display and a corresponding walkthrough step sequence, in accordance with some exemplary embodiments of the disclosed subject matter.

Referring now to FIG. 3 illustrating an exemplary GUI display and a corresponding walkthrough step sequence, in accordance with some exemplary embodiments of the disclosed subject matter.

In some exemplary embodiments, the GUI Display 335 illustrates an exemplary display of an application, e.g., the Empire Bank application. The Walkthrough Sequence 330 illustrates an exemplary flow or sequence of steps of the walkthrough, corresponding to Steps 1-8 of the process of taking loan as described above. In some exemplary embodiments, each step of Walkthrough Sequence 330 relates to one or more GUI elements in GUI Display 335, or to one or more GUI elements that can be reached via GUI Display 335, e.g., by pressing on Date Picker Button 317, which may cause a new window to pop up. In some exemplary embodiments, the Walkthrough Sequence 330 may be configured to acquire, for each step, one or more corresponding GUI elements in the GUI, e.g., using an acquisition process.

As illustrated in FIG. 3, the first Step 310 of Walkthrough Sequence 330 instructs the user to click the tab "Loans and Mortgages", and is associated to the GUI Element 315 in GUI Display 335, which consists of the corresponding tab "Loans and Mortgages". Similarly, the second Step 320 of the walkthrough sequence, which instructs the user to click the tab "instant loan", is associated to the GUI Element 325 in GUI Display 335, which consists of the tab "instant loan". The next steps of Walkthrough Sequence 330 correspond similarly to GUI elements in GUI Display 335, e.g., as illustrated by the denoted arrows connecting each GUI element with a corresponding step in Walkthrough Sequence 330. In some exemplary embodiments, in order to display the descriptive element of the first Step 310 adjacently to the GUI Element 315 in GUI Display 335, e.g., in a balloon window, the walkthrough layer may be configured to identify the GUI Element 315, e.g., using an acquisition process. In some exemplary embodiments, in order to display the descriptive element of the second Step 320 adjacently to the GUI Element 325 in GUI Display 335, e.g., in a balloon window, the walkthrough layer may be configured to identify the GUI Element 325, e.g., using an acquisition process.

In some exemplary embodiments, executing Walkthrough Sequence 330 on GUI Display 335 may cause at least some GUI elements referred to by a step of Walkthrough Sequence 330 to be augmented with a corresponding descriptive element. The Walkthrough Sequence 330 may be configured to encourage a user to perform an action associated with the GUI element to which the descriptive element is attached. Upon completion of the action, an advancement condition that is associated with each walkthrough step may be complied with, and the next step of Walkthrough Sequence

330 may be triggered, invoked, or the like. For example, the advancement condition of the first Step 310 of Walkthrough Sequence 330, which instructs the user to click the tab "Loans and Mortgages", may be fulfilled upon the user clicking the GUI Element 315 in GUI Display 335, e.g., based on monitoring the screen and identifying that the content of the tab "Loans and Mortgages" entered the view. In some exemplary embodiments, the walkthrough layer may identify that the advancement condition is fulfilled by monitoring the screen of user device displaying the application's GUI or in any other manner.

Figure 4:
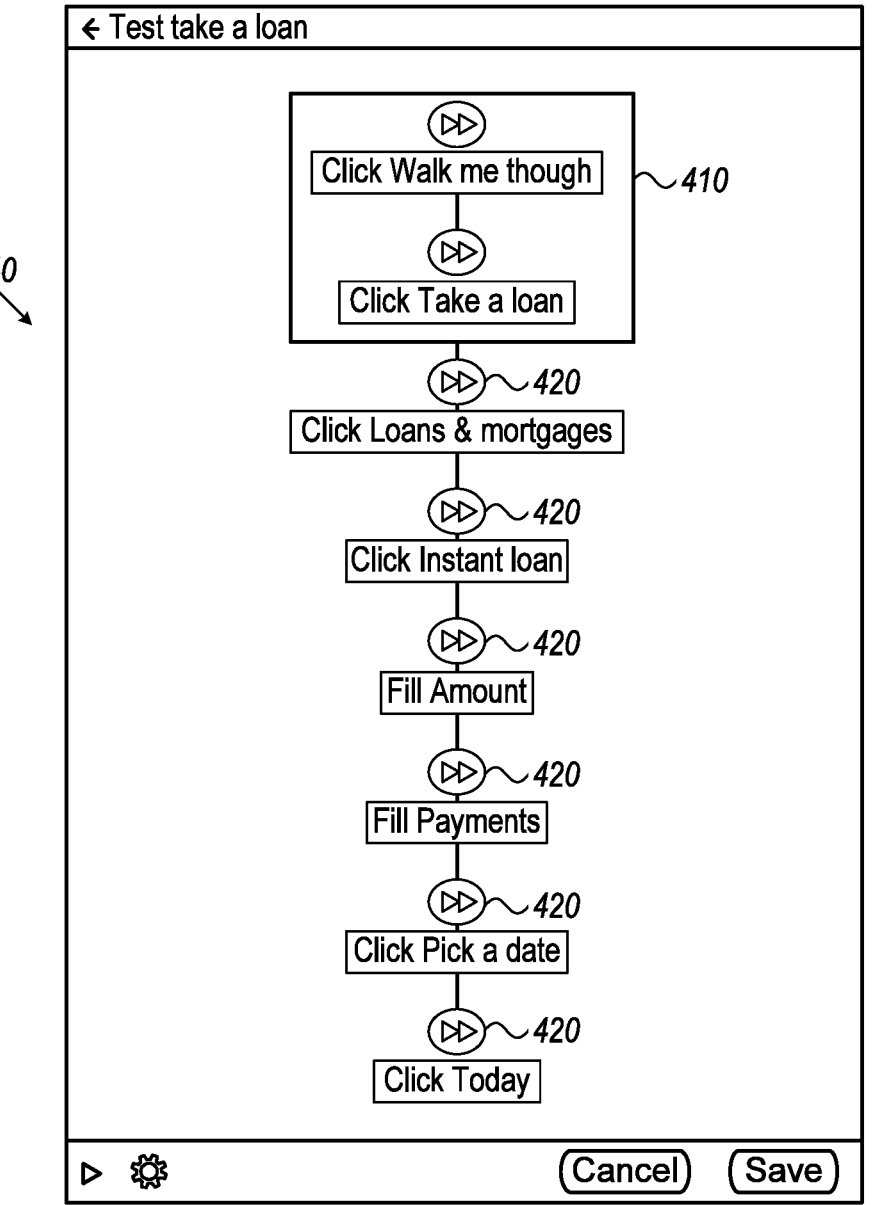
FIG. 4 illustrates an exemplary test sequence, in accordance with some exemplary embodiments of the disclosed subject matter.

Referring now to FIG. 4 illustrating an exemplary Test Sequence 440, in accordance with some exemplary embodiments of the disclosed subject matter.

In some exemplary embodiments, Test Sequence 440 may be created, recorded, or the like, by a user following the walkthrough steps of FIG. 3 and recording his performed interactions with the GUI to create a test. In some exemplary embodiments, Test Sequence 440 may comprise a sequence of automated user actions, configured to complete Walkthrough Sequence 330 (FIG. 3) automatically instead of completing it by a user, e.g., by automatically repeating the recorded steps of the test. In some exemplary embodiments, Test Sequence 440 may start with Pre-testing Actions 410, comprising automatically opening or launching a menu of walkthroughs, e.g., provided by a walkthrough generator, a walkthrough entity, or the like. In some exemplary embodiments, the menu may comprise a database, a repository, a folder, or the like, with one or more walkthroughs associated to different functionalities of a same application, to a different application, or the like. In some exemplary embodiments, the Pre-testing Actions 410 may comprise selecting the desired walkthrough that is to be tested from a repository of walkthroughs, e.g., according the desired functionality of the application. For example, in the current example, a walkthrough that is configured to assist a user with taking a loan via the Empire Bank application may be selected. Pre-testing Actions 410 may be replaced with any other actions or operations configured to ensure that both the walkthrough and the application are running on the device, prior to performing a test of the walkthrough. In case the user wishes to test multiple walkthroughs in a single batch, each test may perform Pre-testing Actions 410 to both the associated walkthrough, complete the test, and then terminate prior to performing Pre-testing Actions 410 of a next test in the batch.

In some exemplary embodiments, after the Pre-testing Actions 410, both the walkthrough and the Empire Bank application for which the walkthrough is configured may be in an open launched state, e.g., running, executing, or the like, on the user device. In some exemplary embodiments, Test Sequence 440 may comprise, subsequent to Pre-testing Actions 410, a plurality of Automated User Actions 420, configured to comply with a corresponding advancement condition and trigger the next step of the walkthrough sequence, e.g., a next step of Walkthrough Sequence 330 (FIG. 3). In some exemplary embodiments, the Automated User Actions 420 may be configured to simulate or imitate an end user that follows the walkthrough instructions of the walkthrough sequence, e.g., Walkthrough Sequence 330 (FIG. 3), by repeating the recorded actions of the test generator.

In some exemplary embodiments, in order to perform Automated User Actions 420 of Test Sequence 440, acquisition results of the walkthrough may be used to identify an element that is to be activated or used, e.g., directly or indirectly, to which recorded actions of the test are implemented. In some exemplary embodiments, the activation manner of the element may be determined based on the recorded actions which may include a recorded input that is provided, a recorded cursor location, a recorded functionality or interaction with the element, a determined input that is to be generated as configured by the test generating user, or the like.

Referring now to FIG. 5 illustrating an exemplary Test Sequence 540 of automated user actions and a corresponding Walkthrough Sequence 530 of steps, in accordance with some exemplary embodiments of the disclosed subject matter.

In some exemplary embodiments, as illustrated in FIG. 5, each Walkthrough Step 510 of Walkthrough Sequence 530 correlates or matches to an Automated User Action 520 of Test Sequence 540. In other cases, one or more steps of Walkthrough Sequence 530 may correspond to a single action of Test Sequence 540, one or more actions of Test Sequence 540 may correspond to a single step of Walkthrough Sequence 530, or multiple steps of Walkthrough Sequence 530 may correspond to multiple actions of Test Sequence 540. In some exemplary embodiments, the first Walkthrough Step 510 is configured to place a descriptive element with the corresponding instruction adjacently to the tab "Loans and Mortgages", and instructs the user to click on the tab "Loans and Mortgages". In some exemplary embodiments, upon execution of the first Walkthrough Step 510, the descriptive element may be placed adjacently to the tab "Loans and Mortgages". In some exemplary embodiments, the first Automated User Action 520 of the test sequence, which correlates to the first Walkthrough Step 510, may consist of an action of clicking on the tab "Loans and Mortgages", thereby causing the GUI display to comply with the advancement condition of the first Walkthrough Step 510, and causing a next step of the Walkthrough Sequence 530 to be invoked, e.g., iteratively.

Referring now to FIG. 6 illustrating an exemplary Trace Display 650 of a successful test execution, in accordance with some exemplary embodiments of the disclosed subject matter. In some exemplary embodiments, after successfully completing the test execution, or simultaneously during the execution, Trace Display 650 may be generated to present the performed walkthrough events and the corresponding automated user actions of the test. In some exemplary embodiments, Trace Display 650 may display a chronological order of events according to their execution order, e.g., thereby providing an interleaved display combining walkthrough steps and corresponding automated user actions. In some exemplary embodiments, in contrary to the illustration of FIG. 6, the interleaved display may not necessarily comprise one walkthrough action followed by one test action followed by one walkthrough action and so on. Alternatively, the interleaved display may comprise interleaved batches of walkthrough actions and test actions.

In some exemplary embodiments, as illustrated in FIG. 6, Trace Display 650 may first record the Pre-testing Actions 610 of the test, which are configured to select and open the desired walkthrough that is to be tested, as part of the test sequence. Next, Trace Display 650 consists of interleaved walkthrough events and test events. In some exemplary embodiments, the first Walkthrough Step 620 comprises the walkthrough instruction to click on the tab "Loans and Mortgages". The following step of the trace display comprises the corresponding Automated User Action 630, corresponding to the first Walkthrough Step 620, which is configured to automatically click on the tab "Loans and Mortgages", as performed by the user recording the test during the recordation. The following steps may similarly comprise one or more walkthrough actions followed by one or more test actions.

In some exemplary embodiments, a Report 660 may be generated according to Trace Display 650, to describe the result of the testing and attributes thereof. In the current example, in the illustrated scenario, the entire test was successfully executed, which is indicated in Report 660 as a "passed" result. Report 660 may comprise information such as the name of the walkthrough process that is tested (e.g., the process of taking a loan), whether the test has passed or failed, timing parameters of the test such as a duration of the test, a starting time, or the like, parameters of the user device that executed the test, such as its operating system type, its browser type, or the like. In some exemplary embodiments, any other additional or alternative information may be included in Report 660 or provided separately from Report 660, e.g., screenshots of the test execution, screenshots of the original test, acquisition information, or the like, originating from the walkthrough layer, from the test layer, or the like.

Figure 7A:
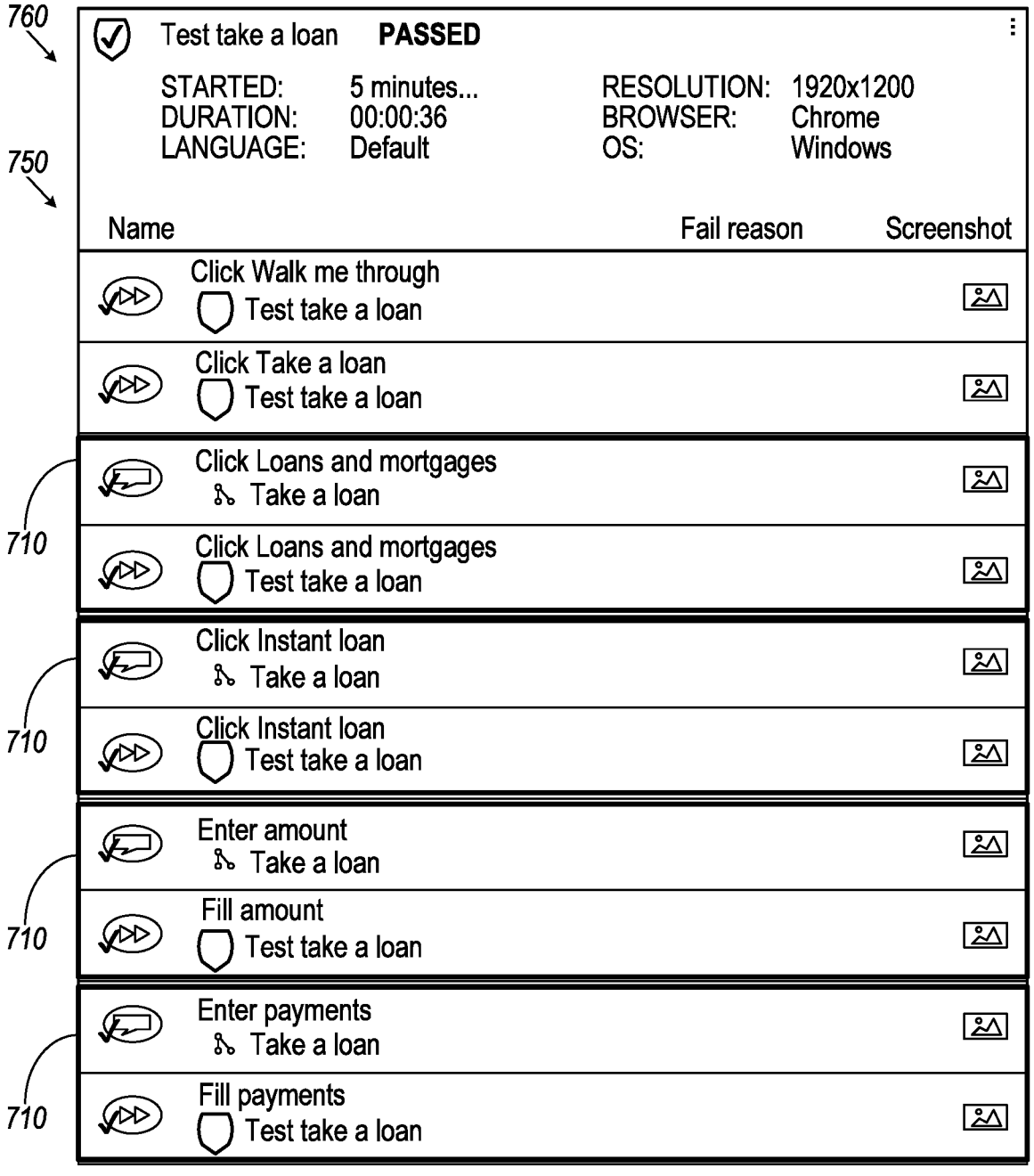
FIGS. 7A-7B illustrate an exemplary trace display, in accordance with some exemplary embodiments of the disclosed subject matter.
Figure 7B:
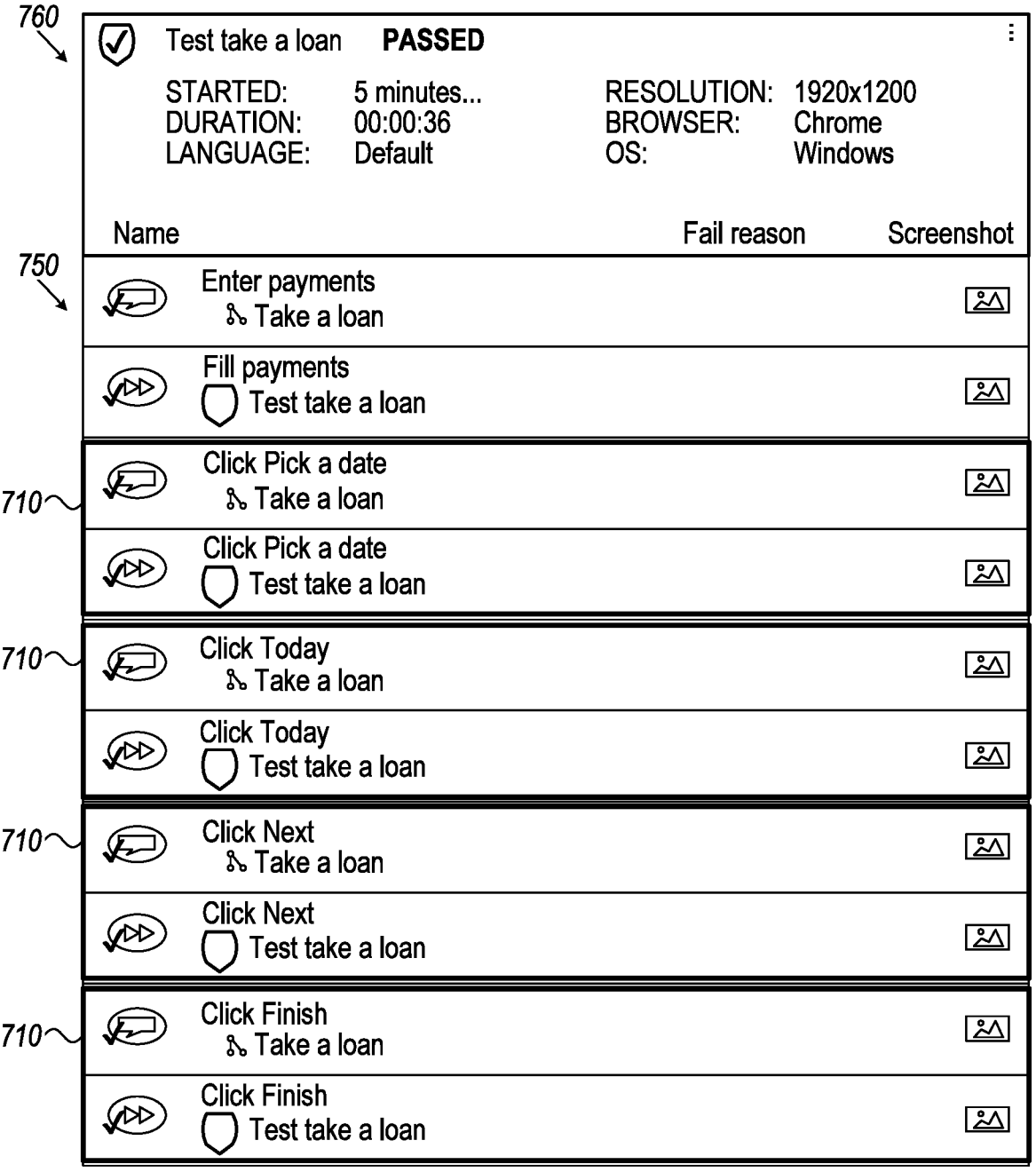

Referring now to FIGS. 7A and 7B illustrating an exemplary Trace Display 750, in accordance with some exemplary embodiments of the disclosed subject matter. In some exemplary embodiments, Trace Display 750 may correspond to Trace Display 650 (FIG. 6), and Report 760 may correspond to Report 660 (FIG. 6), as they may relate to a same trace display generated for a same test execution.

In some exemplary embodiments, Trace Display 750 may comprise a record of ordered events performed with respect to Steps 1-8 described above. In some exemplary embodiments, as illustrated in FIGS. 7A and 7B, Trace Display 750 may comprise, altogether, eight Couples 710 of events corresponding to Steps 1-8 described above, respectively. The number of Couples 710 of events may correspond to any other number of steps, depending on the steps of the process that is tested. In some exemplary embodiments, each Couple 710 may comprise a mixed couple of one or more walkthrough events followed by one or more test events, e.g., the automated user actions implementing the instructions of a walkthrough step.

Figure 8:
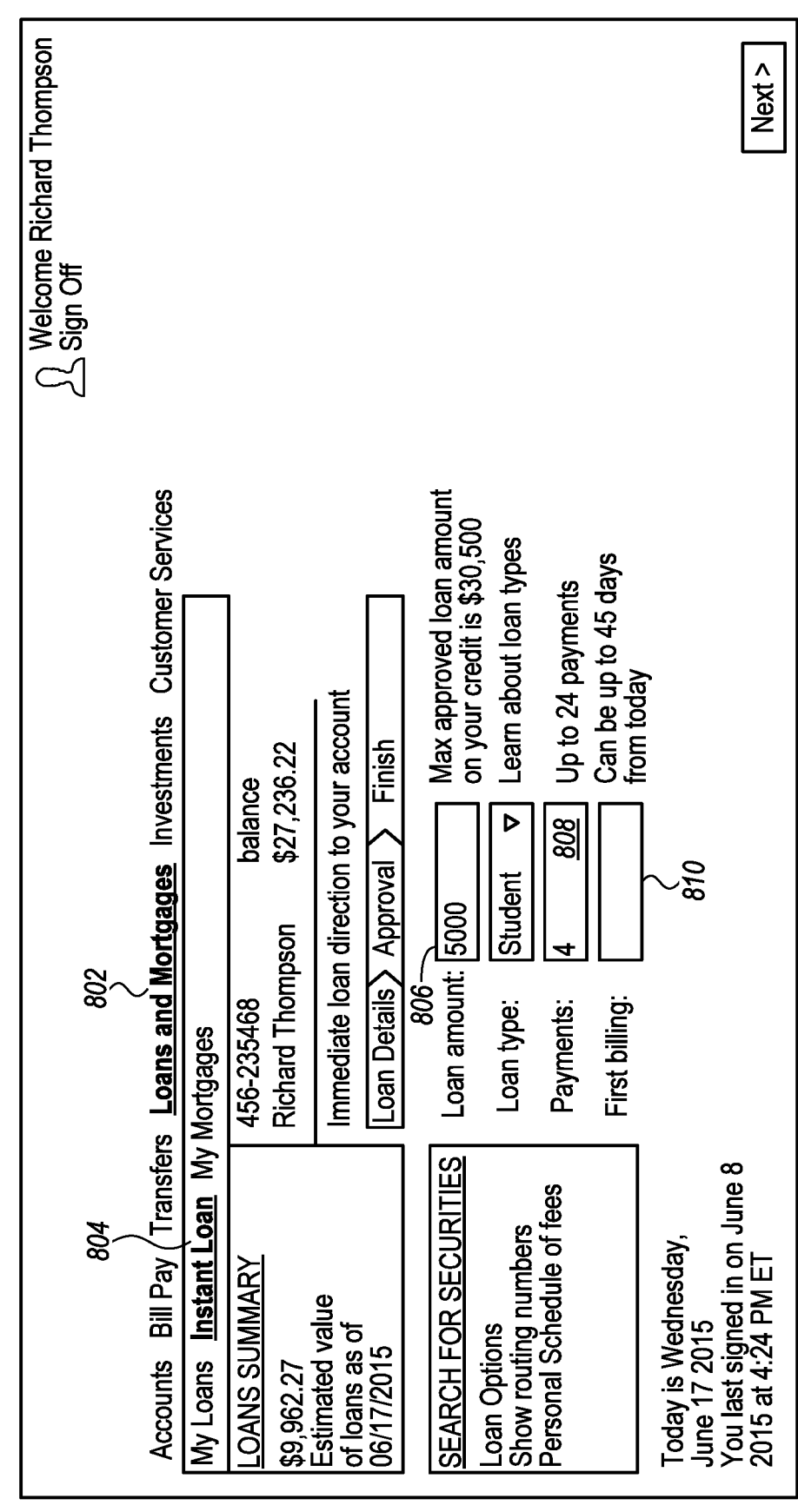
FIG. 8 illustrates an exemplary GUI display, in accordance with some exemplary embodiments of the disclosed subject matter.

Referring now to FIG. 8 illustrating an exemplary GUI Display 835 of a failed test execution, in accordance with some exemplary embodiments of the disclosed subject matter. In some exemplary embodiments, GUI Display 835 may be altered compared to the original GUI Display 335 (FIG. 3), e.g., as the Date Picker Button 317 (FIG. 3) may be removed from the denoted "First billing" text box.

In some exemplary embodiments, upon executing the walkthrough and the test on GUI Display 835, Step 802 of the walkthrough, which corresponds to Step 1 of the walkthrough, may be performed, e.g., by acquiring the tab "Loans and Mortgages", adding a descriptive element thereto, and then tested by automatically pressing the tab by the recorded automated user actions of the test sequence. Next, Step 804, which corresponds to Step 2 of the walkthrough, may be performed, e.g., by acquiring the tab "Instant Loan", adding a descriptive element thereto, and automatically pressing the tab by the recorded automated user actions of the test sequence. Next, Step 806, which corresponds to Step 3 of the walkthrough, may be performed, e.g., by acquiring the text box "Loan Amount", adding a descriptive element thereto, and automatically inserting input text thereto by the recorded automated user actions of the test sequence (the denoted text '5000', which was inputted by the recording user or is randomly generated). Next, Step 808, which corresponds to Step 4 of the walkthrough, may be performed, e.g., by acquiring the text box "Payments", adding a descriptive element thereto, and automatically inserting text thereto by the recorded automated user actions of the test sequence (the denoted text '4', which was inputted by the recording user or is randomly generated). In some exemplary embodiments, the values inserted by the test may correspond to values that were inserted to the text boxes during recordation of the test by an operator, or to values defined thereafter upon editing the test.

In some exemplary embodiments, upon attempting to perform Step 810, the acquisition process of the walkthrough may attempt to locate a date picker button such as Date Picker Button 317 (FIG. 3) in order to perform Step 5 of the walkthrough, which includes identifying Date Picker Button 317 (FIG. 3), and adding a descriptive element saying, "Click Pick A Date" adjacently to Date Picker Button 317 (FIG. 3).

In some exemplary embodiments, as Date Picker Button 317 (FIG. 3) has been removed from GUI Display 835, the acquisition process of Step 810 may fail to identify a date picker button. In some exemplary embodiments, the test execution may fail to proceed, and thus may terminate, such as due to an "Element Not Found" error or due to a timeout error. In some exemplary embodiments, the test execution may terminate due to a time threshold passing, e.g., a time threshold for complying with the advancement condition of Step 810.

Alternatively, the acquisition process may identify a wrong GUI element as allegedly being the date picker button that is attempted to be acquired by Step 810. In such cases, Step 810 may be wrongly performed, as the descriptive element "Click Pick a Date" may be placed near a wrong GUI element in GUI Display 835. In some exemplary embodiments, the test execution may terminate prior to being completed since the advancement condition may not be complied with, since the corresponding automated user action of Step 810, configured to press on Date Picker Button 317 (FIG. 3), may not be successfully executed, or the like. In some exemplary embodiments, the test execution may terminate prior to being completed since one or more next acquisition processes, after Step 810, may fail, e.g., in case the automated user action is enabled to be implemented on the wrong GUI element and the advancement condition is not successfully implemented. For example, Step 6 of the process, which may be associated to a popped up schedule that is configured to be launched upon pressing on Date Picker Button 317 (FIG. 3), may not identify a schedule, since the desired schedule may not be launched and found. In some exemplary embodiments, the test execution may terminate prior to being completed since one or more walkthrough steps or automated user actions in remaining steps, e.g., Steps 6-9, may not be completed due to the wrongful acquisition of Step 810.

In some exemplary embodiments, GUI Display 835 may be altered compared to GUI Display 335 (FIG. 3), e.g., due to the user device having a different version of the Empire Bank application, due to the user device having a different GUI layout of the Empire Bank application, due to the user device having a different operating system or platform executing the application and walkthrough, since an application developer removed the date picker functionality by removing the button element, a combination thereof, or due to any other cause.

Figure 9:
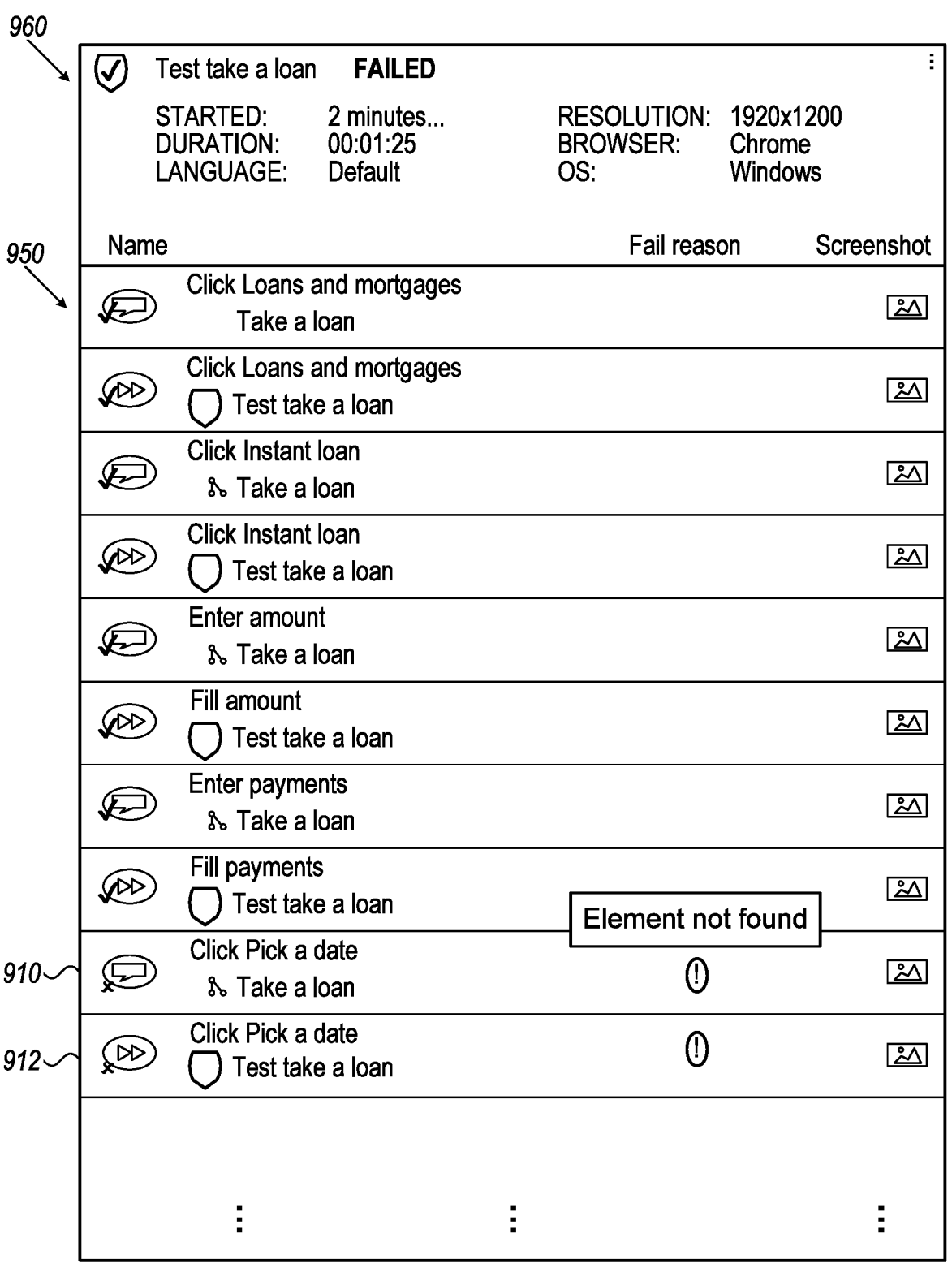
FIG. 9 illustrates an exemplary trace display corresponding to the GUI display of FIG. 8, in accordance with some exemplary embodiments of the disclosed subject matter.

Referring now to FIG. 9 illustrating an exemplary Trace Display 950 corresponding to the failed test execution of FIG. 8, in accordance with some exemplary embodiments of the disclosed subject matter. In some exemplary embodiments, after termination of the test execution, or simultaneously thereto, Trace Display 950 may be displayed or generated to indicate the performed walkthrough events and the corresponding testing events that were performed prior to the test execution failure and termination. In some exemplary embodiments, Trace Display 950 may correspond to Steps 802-810 of FIG. 8, according to their chronological order, e.g., thereby providing an interleaved display of walkthrough Steps 802-810 and corresponding automated user actions.

In some exemplary embodiments, as illustrated in FIG. 9, Walkthrough Step 910 and/or corresponding Automated User Action 912 were attempted to be performed but resulted with an "Element Not Found" error or any other error due to a failed acquisition, a timeout, or the like. Walkthrough Step 910 and corresponding Automated User Action 912 both depend on acquisition of the GUI element, and thus are both unable to complete execution of Step 810 (FIG. 8). Trace Display 950 may indicate the failed events, e.g., Walkthrough Step 910 and corresponding Automated User Action 912, using visual indications, e.g., a sign of failure such as an 'x' sign, an exclamation mark, a color that signals failure different from a color that signals success, a dotted border, a border different from a border of successful steps, a combination thereof, or the like. Alternatively, Report 960 may indicate that Walkthrough Step 910 and corresponding Automated User Action 912 have failed to be executed, such as using non-visual indications, e.g., audio indications. For example, an audio indication may vocally describe that Walkthrough Step 910 and corresponding Automated User Action 912 of Trace Display 950 have failed to be executed.

In some exemplary embodiments, a Report 960 may be generated in association to Trace Display 950, describing the failed test results, failed test events, attributes of the testing, attributes of the user device, screenshots of the execution, or the like. As illustrated in FIG. 9, Report 960 may indicate that the test execution of the walkthrough of the process "take a loan" has failed.

Referring now to FIG. 10 illustrating an exemplary Trace Display 1050 of a process "add a contact", in accordance with some exemplary embodiments of the disclosed subject matter. In some exemplary embodiments, Trace Display 1050 may illustrate various types of events from which a trace display of a test may consist.

In some exemplary embodiments, Trace Display 1050 may comprise a record of ordered events performed with respect to the process "add a contact", which is configured to assist a user with adding a contact at an application. In some exemplary embodiments, as illustrated in FIG. 10, Trace Display 1050 may comprise, in addition to events and walkthrough events that add descriptive elements, one or more additional walkthrough events. In some exemplary embodiments, the additional walkthrough events may comprise walkthrough monitoring events such as Monitoring Step 1010, which is configured to wait one second upon identifying that the monitored screen of the user device comprises a visible form for adding a contact, before continuing the walkthrough. In some exemplary embodiments, the additional walkthrough events may comprise one or more goal steps such as Goal Step 1012, which is configured to identify that a goal state of the walkthrough has been met. In some exemplary embodiments, Goal Step 1012 may comprise a condition defined for a walkthrough that determines a state of the walkthrough. For example, as illustrated in FIG. 10, Goal Step 1012 indicates that the form that is to be filled out has been successfully launched. This does not indicate that the walkthrough is successful, since the walkthrough has additional steps that were not yet completed such as filling in the visible form. However, such goal steps may be utilized, e.g., in case of a failure, to identify a cause of the failure, an area of the walkthrough that was not performed properly, or the like.

In some exemplary embodiments, additionally or alternatively to the scenario of FIG. 10, goal steps may comprise a condition defined for a walkthrough that determines whether or not the entire walkthrough was successful, e.g., as part of the walkthrough layer, such as in order to measure the effectiveness of walkthroughs. In some exemplary embodiments, in case such a goal step is complied with, the walkthrough may be determined to be successful, while in case it is not complied with, the walkthrough may be determined to have failed. In some exemplary embodiments, the test layer may utilize the goal event in order to determine if the test was successful, e.g., in case it depends on whether the walkthrough goal is completed.

As illustrated in FIG. 10, Goal Step 1012 is followed by a walkthrough step that is configured to add a descriptive element to the GUI, and then by a batch of subsequent automated user actions configured to follow the directions of the descriptive element.

In some exemplary embodiments, a Report 1060 may be generated in association to Trace Display 1050, describing the test results, attributes of the testing, attributes of the user device, or the like, of the process "add a contact".

Figure 11B:
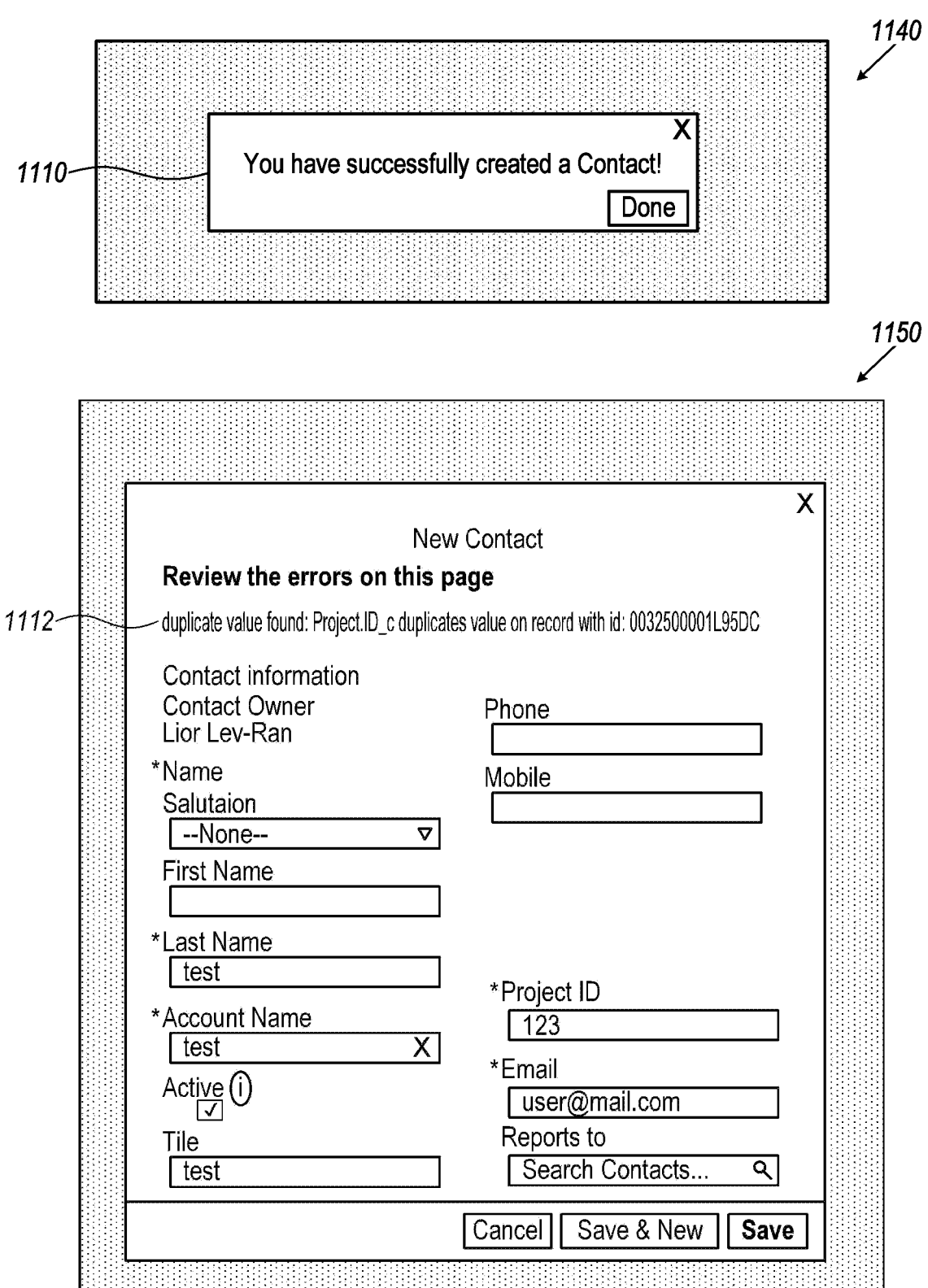

Referring now to FIGS. 11A-11B illustrating an exemplary GUI of a failed scenario of the process "add a contact", in accordance with some exemplary embodiments of the disclosed subject matter.

In some exemplary embodiments, a recording user may record a process for adding a contact to a database of an application by inserting input values to fields in the contact adding form. Successful Screenshot 1140 displays a screen of the user device upon successful completion of the test recording, where the application generated a Success Message 1110 saying, "You have successfully created a Contact". This display may indicate that the contact has been successfully added, and may be used as an advancement condition of the walkthrough.

In some exemplary embodiments, upon re-execution of the recorded automated actions of the test on the application with the walkthrough, the same recorded input values that were inserted by the recording user may be inserted again to the contact form fields automatically, to create a different contact with the same input values. However, the contact form may require a contact identifier field to have a unique value, thereby causing the execution of the test to fail for any execution that is subsequent to the original test. In some exemplary embodiments, upon inputting the same values to the contact fields, Failed Screenshot 1150 may be generated by the application to include a screen of the user device upon failure of the test execution, where the application generated an Error Message 1112, saying "duplicate value found: Project ID . . . ".

In some exemplary embodiments, upon identifying that a test of the walkthrough has failed, the test layer may compare a Successful Screenshot 1140 of a successful test execution with Failed Screenshot 1150, captured upon failure of the test execution at the user device. In some exemplary embodiments, Successful Screenshot 1140 may be captured during recordation of the test by the recording user, e.g., at the user device or at a different device, during a one or more previous executions of the test after completion of the test recordation, e.g., a last successful execution prior to the failure, or the like.

In some exemplary embodiments, screenshots of the displayed GUI of the screen of the user device may be captured upon each action performed by the test, each action performed by the walkthrough, e.g., each monitoring step, each timeout step, each goal step, or the like. Alternatively, screenshots of the displayed GUI of the screen of the user device may be captured periodically, upon identifying an event, in response to a user instruction, during completion of an execution, during completion of an execution stage, or the like.

In some exemplary embodiments, as illustrated in FIG. 11A, Screenshots 1142, 1144, 1146 capture screens of three respective successful steps that were completed during the failed test execution, e.g., the steps of inserting the text "123" to the contact identifier field, filling an e-mail field with the e-mail of the recording user, and clicking save. In some exemplary embodiments, as illustrated in FIG. 11A, Screenshots 1152 and 1153 capture screens of two respective failed steps that were not completed during the failed test execution, e.g., including a timeout for waiting to the success window of Successful Screenshot 1140.

In some exemplary embodiments, as illustrated in FIG. 11B, the user may compare the Success Message 1110 to the Error Message 1112, and determine based thereon that the failure is due to a non-unique contact identifier, as indicating by the Error Message 1112. In some cases, the comparison may not be required as the Error Message 1112 alone may be utilized to identify the failure cause. Based on the identified failure, the user may edit the test actions so that the test will generate unique numeric values for the contact identifier field of the contact form, or perform any other action to overcome the error such as amending the test, amending the walkthrough, amending the acquisition process, or the like.

In some exemplary embodiments, the test layer may be enable to compare screenshots of a same stage of the walkthrough that was previously executed successfully, that were recorded during the original test, or the like, such as Successful Screenshot 1140, to the screenshot of the failed stage of the current test execution, such as Failed Screenshot 1150. In some exemplary embodiments, an administrative user may manually review the Successful Screenshot 1140 and Failed Screenshot 1150, e.g., at a remote server or at the end device, and analyze the failure of the test based thereon. In some exemplary embodiments, the test layer may automatically perform a comparison between Successful Screenshot 1140 and Failed Screenshot 1150, an analysis of Successful Screenshot 1140 and Failed Screenshot 1150, or the like, e.g., locally at the end device, and analyze the failure based thereon.

Figure 12:
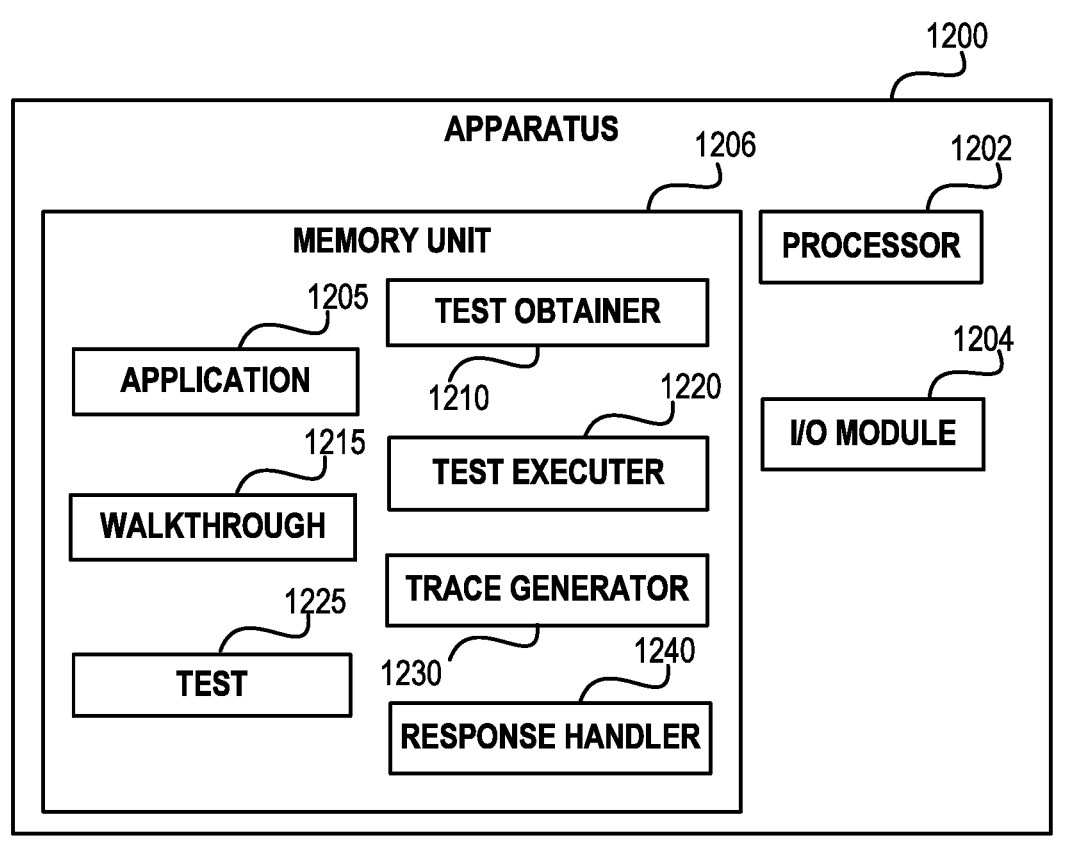
FIG. 12 shows a block diagram of an apparatus, in accordance with some exemplary embodiments of the disclosed subject matter.

Referring now to FIG. 12, showing an apparatus in accordance with some exemplary embodiments of the disclosed subject matter.

In some exemplary embodiments, Apparatus 1200 may be comprised in a client device, such as Client Device 110 of FIG. 1. In some exemplary embodiments, Apparatus 1200 may comprise one or more Processor(s) 1202, an Input/Output (I/O) Module 1204, a Memory Unit 1206, or the like.

In some exemplary embodiments, Processor 1202 may be a Central Processing Unit (CPU), a Graphical Processing Unit (GPU), a microprocessor, an electronic circuit, an Integrated Circuit (IC) or the like. Processor 1202 may be utilized to perform computations required by Apparatus 1200 or any of its subcomponents.

In some exemplary embodiments, Apparatus 1200 may comprise an Input/Output (I/O) Module 1204. I/O Module 1204 may be utilized to communicate with other computerized devices, such as Server 120 of FIG. 1, or the like, to obtain a Walkthrough Layer 1215, a Test Layer 1225, to notify the server of failed testing, or the like.

In some exemplary embodiments, Apparatus 1200 may comprise Memory Unit 1206. Memory Unit 1206 may be a hard disk drive, a Flash disk, a Random Access Memory (RAM), a memory chip, or the like. In some exemplary embodiments, Memory Unit 1206 may retain program code operative to cause Processor 1202 to perform acts associated with any of the subcomponents of Apparatus 1200.

Memory Unit 1206 may be utilized to retain an Application 1205 or access thereto, which may comprise a native mobile application, a website, a dedicated web application, a hybrid application, a generic mobile application, or the like.

Memory Unit 1206 may be utilized to retain a Walkthrough Layer 1215. In some exemplary embodiments, Walkthrough Layer 1215 may comprise a software layer, a computer program, a computing block, or the like, configured to provide one or more walkthroughs to Application 1205. In some exemplary embodiments, Walkthrough Layer 1215 may retain a repository of walkthroughs associated with functionalities of applications.

Memory Unit 1206 may be utilized to retain a Test Layer 1225. In some exemplary embodiments, Test Layer 1225 may be configured to test walkthroughs retained at Walkthrough Layer 1215, when executing on Application 1205. In some exemplary embodiments, Test Layer 1225 may comprise a software, software layer, a computer program, a computing block, or the like. In some exemplary embodiments, Test Layer 1225 may have access to data of Walkthrough Layer 1215, e.g., as they may be part of a same code block, software unit, or the like.

Memory Unit 1206 may comprise one or more components as detailed below, implemented as executables, libraries, static libraries, functions, or any other executable components.

Memory Unit 1206 may comprise Test Recorder 1210. Test Recorder 1210 may be configured to obtain a software unit comprising Test Layer 1225 and Walkthrough Layer 1215 from a server, a computing device, or the like. In some exemplary embodiments, the software unit may comprise a program code, e.g., a JavaScript™ code or any other type of code, that may be injected to a page of Application 1205. In some exemplary embodiments, the software unit may be injected to the page by a browser extension, may be added permanently to the page, or the like. In some exemplary embodiments, the software unit may enable Test Recorder 1210 to record any test of a user, by simply enabling the user to perform a desired sequence of user interactions with a GUI executing the walkthrough over Application 1205, and record every interaction of the user with the GUI, capture screens of every action or feature thereof, or the like.

Memory Unit 1206 may comprise Test Executer 1220, which may be configured to execute a batch of one or more tests, e.g., sequentially, over the Application 1205. Test Executer 1220 may be configured to execute one or more tests over a walkthrough of Walkthrough Layer 1215, e.g., in order to test the walkthrough when running over Application 1205. In some exemplary embodiments, Test Executer 1220 may be configured to launch the desired walkthrough over Application 1205, e.g., via Walkthrough Layer 1215, and test it. In some exemplary embodiments, Test Executer 1220 may be configured to attempt to execute each step of the executing test after the corresponding step of the walkthrough, e.g., in an interleaved manner. In some cases, each step of the walkthrough or the test may comprise one or more actions, interactions with the GUI, or the like.

Memory Unit 1206 may comprise Trace Generator 1230. Trace Generator 1230 may be configured to generate a trace display based on the executed test. Trace Generator 1230 may be configured to include in the trace display every step of the test and the walkthrough that was performed or attempted to be performed, e.g., including failed steps. Trace Generator 1230 may be configured to indicate, with respect to steps that were attempted to be performed but failed, that the steps have failed to be executed, e.g., using a visual cue. The trace display may comprise additional steps such as goal steps, monitoring steps, and so on, indicating events, timeouts, or actions that were identified or captured during the execution of the test.

Trace Generator 1230 may be configured to generate additional displays, such as a walkthrough display comprising only walkthrough steps that were performed or attempted to be performed, a test display comprising only test steps that were performed or attempted to be performed, a display comprising only test steps and descriptive elements steps of the walkthrough, or the like. Trace Generator 1230 may be configured to include in the display screenshots of test and walkthrough actions, a link to the screenshots, or the like.

Memory Unit 1206 may comprise Response Handler 1240. Response Handler 1240 may be configured to obtain the one or more displays from Trace Generator 1230, one or more screenshots, one or more captured events of the walkthrough, testing reports, acquisition information, or the like, and provide them to a displaying device, to a user device, to an analyzing device, or the like. In some exemplary embodiments, Response Handler 1240 may communicate the information to a server or an analyzing entity, such as in the form of a report, e.g., in response to a failed testing, in response to any testing execution including successful testing, in response to completing a testing of a specific type, such as from a specific type of user device, or the like. Alternatively, Response Handler 1240 may analyze the information locally, e.g., at Apparatus 1200. Response Handler 1240 may be configured to alert the user of the user device regarding failed tests, successful tests, authentication of a walkthrough, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a walkthrough of an application, the walkthrough comprising an executable tutorial of the application, wherein the application comprises a Graphical User Interface (GUI), wherein the walkthrough is defined by a sequence of steps and an associated sequence of advancement conditions, wherein for each advancement condition of the sequence of advancement conditions, in response to the advancement condition being met, a next step in the sequence of steps is configured to be invoked, wherein a step of the sequence of steps comprises presenting a descriptive element that is associated to a functionality of a GUI element of the GUI of the application, wherein at least one advancement condition of the advancement conditions is configured to be met by actions of a user that is interacting with the GUI;

obtaining a test of the walkthrough of the application, wherein the test comprises a sequence of automated user actions to be provided to the GUI of the application, wherein the sequence of automated user actions is configured to invoke the sequence of steps of the walkthrough, wherein the sequence of automated user actions is configured to mimic interactions of the user with the GUI; and executing, at least partially, the test over the walkthrough, wherein said executing comprises providing the sequence of automated user actions in a manner that is configured to cause the sequence of steps to be invoked, at least in part, whereby providing a test execution, wherein the test execution comprises at least automated user actions of the test intertwined with walkthrough steps, wherein the test execution comprises at least an execution of a first step of the walkthrough, followed by an execution of an automated user action of the test, followed by an execution of a second step of the walkthrough.

2. The method of claim 1, wherein the second step of the walkthrough follows the first step of the walkthrough in the sequence of steps, wherein the first step is associated with a first advancement condition;

wherein the test comprises one or more first automated user actions and one or more second automated user actions, wherein the one or more first automated user actions comprise at least the automated user action, wherein the one or more second automated user actions follow the first automated user actions in the sequence, wherein the first automated user actions are configured to cause the first advancement condition of the first step to be met; and wherein said executing comprises:

implementing the one or more first automated user actions of the test;

monitoring the application to identify that the second step is invoked; and in response to identifying that the second step is invoked, implementing the one or more second automated user actions of the test.

3. The method of claim 2, wherein the second step is associated with a second advancement condition, wherein the walkthrough comprises a third step, wherein the third step follows the second step in the sequence, wherein said executing comprises:

in response to identifying that the third step is not invoked after said implementing the one or more second automated user actions of the test, indicating that the walkthrough failed to properly operate.

4. The method of claim 1 further comprising:

generating a trace display of the test execution, wherein the trace display comprises a visual display of events, wherein the events comprise both the walkthrough steps and the automated user actions of the test, whereby providing an interleaved display between a visual representation of the walkthrough and a visual representation of the test; and outputting the trace display, wherein said executing the test comprises identifying a failed step of the sequence of steps, wherein the test did not cause a subsequent step of the walkthrough to be invoked, wherein the trace display comprises a visual indication of the failed step.

5. The method of claim 1 further comprising:

generating a trace display of the test execution, wherein the trace display comprises a visual display of events, wherein the events comprise both the walkthrough steps and the automated user actions of the test, whereby providing an interleaved display between a visual representation of the walkthrough and a visual representation of the test; and outputting the trace display, wherein said executing the test comprises determining a failed sub-sequence of the sequence of steps, wherein the failed sub-sequence comprises a plurality of steps starting with an initial step that is estimated to have not been properly operated by the test, wherein the failed sub-sequence comprises the initial step and a failed step, wherein the failed sub-sequence ends with the failed step, wherein the trace display comprises a visual indication of the failed sub-sequence.

6. The method of claim 1, wherein the walkthrough is provided by a provider different than a provider of the application, wherein the walkthrough is configured to utilize an acquisition process, wherein the acquisition process is configured to identify an element in the GUI based on parameters associated with the element.

7. The method of claim 1 further comprises: injecting the test and the walkthrough into a page of the application.

8. The method of claim 1 further comprises:

displaying a walkthrough display, wherein the walkthrough display comprises a visual display of the sequence of steps, wherein the walkthrough display is different from the trace display; and displaying a test display, wherein the test display comprises a visual display of the sequence of automated user actions, wherein the test display is different from the trace display.

9. The method of claim 1, wherein the advancement conditions are configured to be met by at least one of:

a timeout;

a user interaction;

the automated user action; and an external event.

10. A system comprising a processor and coupled memory, the processor being adapted to:

obtain a walkthrough of an application, the walkthrough comprising an executable tutorial of the application, wherein the application comprises a Graphical User Interface (GUI), wherein the walkthrough is defined by a sequence of steps and an associated sequence of advancement conditions, wherein for each advancement condition of the sequence ent conditions, in response to the advancement condition being met, a next step in the sequence of steps is configured to be invoked, wherein a step of the sequence of steps comprises presenting a descriptive element that is associated to a functionality of a GUI element of the GUI of the application, wherein at least one advancement condition of the advancement conditions is configured to be met by actions of a user that is interacting with the GUI;

obtain a test of the walkthrough of the application, wherein the test comprises a sequence of automated user actions to be provided to the GUI of the application, wherein the sequence of automated user actions is configured to invoke the sequence of steps of the walkthrough, wherein the sequence of automated user actions is configured to mimic interactions of the user with the GUI; and execute, at least partially, the test over the walkthrough, wherein said executing comprises providing the sequence of automated user actions in a manner that is configured to cause the sequence of steps to be invoked, at least in part, whereby providing a test execution, wherein the test execution comprises at least automated user actions of the test intertwined with walkthrough steps, wherein the test execution comprises at least execution of a first step of the walkthrough, followed by an execution of an automated user action of the test, followed by an execution of a second step of the walkthrough.

11. The system of claim 10, wherein the second step of the walkthrough follows the first step of the walkthrough in the sequence of steps, wherein the first step is associated with a first advancement condition;

wherein the test comprises one or more first automated user actions and one or more second automated user actions, wherein the one or more first automated user actions comprises at least the automated user action, wherein the one or more second automated user actions follow the first automated user actions in the sequence, wherein the first automated user actions are configured to cause the first advancement condition of the first step to be met; and wherein said executing comprises:

implementing the one or more first automated user actions of the test;

monitoring the application to identify that the second step is invoked; and in response to identifying that the second step is invoked, implementing the one or more second automated user actions of the test.

12. The system of claim 11, wherein the second step is associated with a second advancement condition, wherein the walkthrough comprises a third step, wherein the third step follows the second step in the sequence, wherein said executing comprises:

in response to identifying that the third step is not invoked after said implementing the one or more second automated user actions of the test, indicating that the walkthrough failed to properly operate.

13. The system of claim 10 further comprising:

generating a trace display of the text execution, wherein the trace display comprises a visual display of events, wherein the events comprise both the walkthrough steps and the automated user actions of the test, whereby providing an interleaved display between a visual representation of the walkthrough and a visual representation of the test; and outputting the trace display, wherein said executing the test comprises identifying a failed step of the sequence of steps, wherein the test did not cause a subsequent step of the walkthrough to be invoked, wherein the trace display comprises a visual indication of the failed step.

14. The system of claim 10 further comprising:

generating a trace display of the test execution, wherein the trace display comprises a visual display of events, wherein the events comprise both the walkthrough steps and the automated user actions of the test, whereby providing an interleaved display between a visual representation of the walkthrough and a visual representation of the test; and outputting the trace display, wherein said executing the test comprises determining a failed sub-sequence of the sequence of steps, wherein the failed sub-sequence comprises a plurality of steps starting with an initial step that is estimated to have not been properly operated by the test, wherein the failed sub-sequence comprises the initial step and a failed step, wherein the failed sub-sequence ends with the failed step, wherein the trace display comprises a visual indication of the failed sub-sequence.

15. The system of claim 10, wherein the walkthrough is provided by a provider different than a provider of the application, wherein the walkthrough is configured to utilize an acquisition process, wherein the acquisition process is configured to identify an element in the GUI based on parameters associated with the element.

16. The system of claim 10, wherein the processor is adapted to inject the test and the walkthrough into a page of the application.

17. The system of claim 10, wherein the processor is adapted to display a test display, wherein the test display comprises a visual display of the sequence of automated user actions, wherein the test display is different from the trace display.

18. The system of claim 10, wherein the advancement conditions are configured to be met by at least one of:

a timeout;

a user interaction;

the automated user action; and an external event.

19. A non-transitory computer readable medium retaining program instructions, which program instructions when read by a processor, cause the processor to:

obtain a walkthrough of an application, the walkthrough comprising an executable tutorial of the application, wherein the application comprises a Graphical User Interface (GUI), wherein the walkthrough is defined by a sequence of steps and an associated sequence of advancement conditions, wherein for each advancement condition of the sequence of advancement conditions, in response to the advancement condition being met, a next step in sequence of steps is configured to be invoked, wherein a step of the sequence of steps comprises presenting a descriptive element that is associated to a functionality of a GUI element of the GUI of the application, wherein at least one advancement condition of the advancement conditions is configured to be met by actions of a user that is interacting with the GUI;

obtain a test of the walkthrough of the application, wherein the test comprises a sequence of automated user actions to be provided to the GUI of the application, wherein the sequence of automated user actions is configured to invoke the sequence of steps of the walkthrough, wherein the sequence of automated user actions is configured to mimic interactions of the user with the GUI; and execute, at least partially, the test over the walkthrough, wherein said executing comprises providing the sequence of automated user actions in a manner that is configured to cause the sequence of steps to be invoked, at least in part, whereby providing a test execution, wherein the test execution comprises at least automated user actions of the test intertwined with walkthrough steps, wherein the test execution comprises at least an execution of a first step of the walkthrough, followed by an execution of an automated user action of the test, followed by an execution of a second step of the walkthrough.

20. The computer readable medium of claim 19, wherein the walkthrough is provided by a provider different than a provider of the application, wherein the walkthrough is configured to utilize an acquisition process, wherein the acquisition process is configured to identify an element in the GUI based on parameters associated with the element.

* * * * *